US 9,798,484 B2

(12) United States Patent
Kambegawa

(10) Patent No.: US 9,798,484 B2
(45) Date of Patent: Oct. 24, 2017

(54) INFORMATION PROCESSING APPARATUS

(71) Applicant: CANON KABUSHIKI KAISHA, Tokyo (JP)

(72) Inventor: Minoru Kambegawa, Abiko (JP)

(73) Assignee: Canon Kabushiki Kaisha, Tokyo (JP)

( * ) Notice: Subject to any disclaimer, the term of this patent is extended or adjusted under 35 U.S.C. 154(b) by 28 days.

(21) Appl. No.: 15/003,214

(22) Filed: Jan. 21, 2016

(65) Prior Publication Data
US 2016/0224266 A1 Aug. 4, 2016

(30) Foreign Application Priority Data

Jan. 29, 2015 (JP) ................................. 2015-016086

(51) Int. Cl.
*G06F 12/02* (2006.01)
*G06F 3/06* (2006.01)

(52) U.S. Cl.
CPC .......... *G06F 3/0629* (2013.01); *G06F 3/0604* (2013.01); *G06F 3/0673* (2013.01)

(58) Field of Classification Search
CPC .... G06F 3/0629; G06F 3/0673; G06F 3/0604; G06F 3/06
USPC ......................................................... 711/170
See application file for complete search history.

(56) References Cited

U.S. PATENT DOCUMENTS

| 7,978,905 B2* | 7/2011 | Yamamoto | G06N 3/08 382/156 |
| 8,299,816 B2 | 10/2012 | Yamada et al. | |
| 9,479,535 B2* | 10/2016 | Cohen | G06F 21/50 |
| 2009/0287850 A1* | 11/2009 | Furukawa | G06F 12/0207 710/5 |
| 2011/0225415 A1 | 9/2011 | Yamada et al. | |
| 2013/0238834 A1* | 9/2013 | Feldman | G06F 3/0605 711/103 |
| 2015/0277761 A1* | 10/2015 | Kowles | G06F 3/061 711/162 |

FOREIGN PATENT DOCUMENTS

JP          2011-186981 A          9/2011

* cited by examiner

*Primary Examiner* — Pierre-Michel Bataille
(74) *Attorney, Agent, or Firm* — Fitzpatrick, Cella, Harper & Scinto

(57) ABSTRACT

An information processing apparatus comprises: a programmable circuit unit comprising a partial reconfiguration unit; a storage unit used by each of logic circuits configured in the partial reconfiguration unit; and a control unit that controls a logic circuit that becomes an access destination, in accordance with receiving an access command, wherein the control unit compares an address space indicating the access destination of the access command with the signal that is output from the partial reconfiguration unit due to the partial reconfiguration unit being configured using circuit information included in the configuration data, and controls to set as an access destination the logic circuit configured in the partial reconfiguration unit outputting the signal matching the address space indicating the access destination of the access command.

13 Claims, 27 Drawing Sheets

F I G. 3

| PROCESSING ORDER \ JOB TYPE | COPY | PRINT | FAX | SEND |
|---|---|---|---|---|
| CIRCUIT FUNCTION TO EXECUTE FIRST | IMAGE-PROCESSING-FUNCTION-FOR-READING 302 | RIP PROCESSING FUNCTION 318 | JBIG DECOMPRESSION PROCESSING FUNCTION 322 | IMAGE-PROCESSING-FUNCTION-FOR-READING 302 |
| CIRCUIT FUNCTION TO EXECUTE SECOND | IMAGE-PROCESSING-FUNCTION-FOR-PRINTING 303 | IMAGE-PROCESSING-FUNCTION-FOR-PRINTING 303 | IMAGE-PROCESSING-FUNCTION-FOR-FAX 306 | JPEG COMPRESSION PROCESSING FUNCTION 323 |

| INPUT (3bit) | OUTPUT (20bit) |
|---|---|
| 000 | 0x80000 |
| 001 | 0x80001 |
| 010 | 0x80002 |
| 011 | 0x80003 |
| 100 | 0x80004 |
| 101 | 0x80005 |

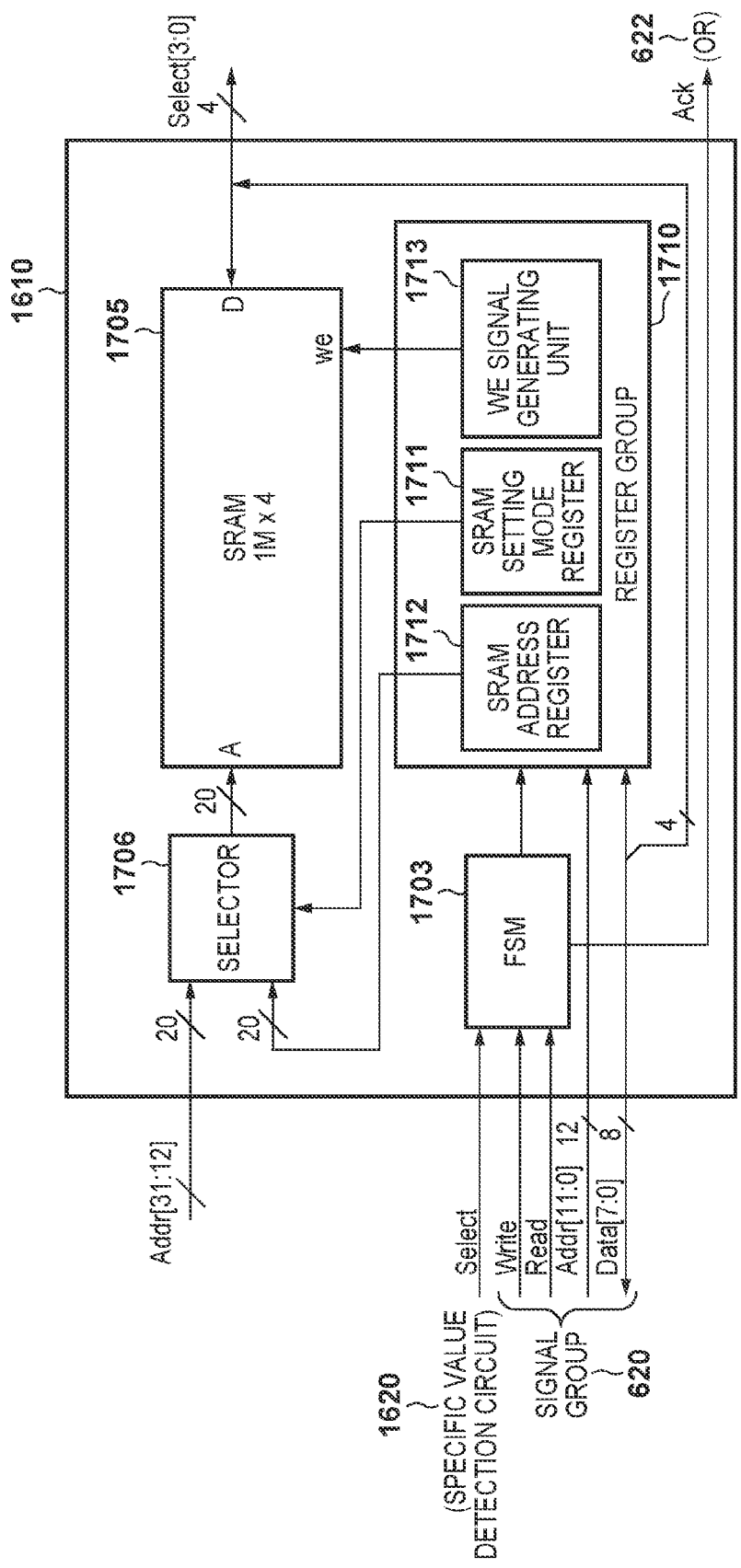

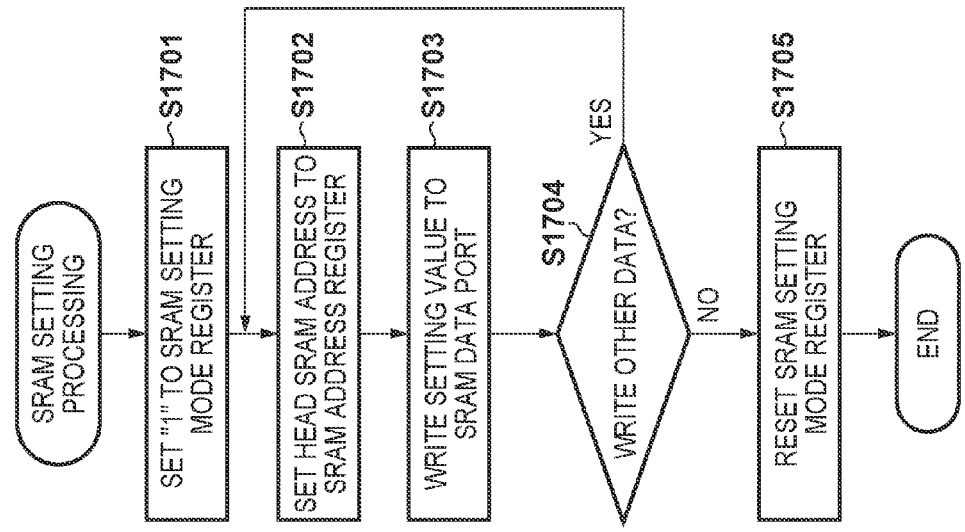
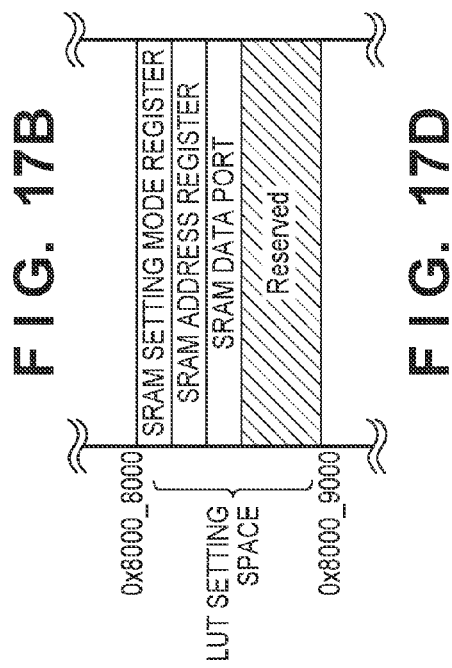

INFORMATION PROCESSING APPARATUS

BACKGROUND OF THE INVENTION

Field of the Invention

The present invention relates to an information processing apparatus.

Description of the Related Art

There is a device having a circuit (also referred to as a configuration memory) provided with a plurality of logical blocks that can be programmed internally by a user. By a user programming each logical block, they can configure various logic circuits (corresponding to functions) on a chip. This programming refers to information of logic (for example AND logic or the like) realized by the logical block as configuration data, and is performed by writing to the configuration memory. This is referred to as configuration. As a representative device, a PLD (Programmable Logic Device) or an FPGA (Field Programmable Gate Array) may be given.

In recent years, a device that segments a configuration memory into a plurality of regions (also referred to as partial reconfiguration units), and enables configuration at separate timings for each partial reconfiguration unit has appeared. Such configuration is referred to as partial reconfiguration. Japanese Patent Laid-Open No. 2011-186981 discloses a method in which each of a plurality of logic circuits that comprise a pipeline are configured in corresponding partial reconfiguration units in the configuration memory in an order from the start of the pipeline.

In Japanese Patent Laid-Open No. 2011-186981, it is possible to configure by switching different logic circuits in one partial reconfiguration unit. In other words, if a plurality of partial reconfiguration units are present in a configuration memory, it is possible to configure a particular function (a logic circuit to realize a particular function) in a partial reconfiguration unit. When performing such a free-location partial reconfiguration, the following problems occur.

For example, a logic circuit corresponding to a function that an application program uses is configured in a partial reconfiguration unit of a device. The application program recognizes logical addresses of a plurality of registers that are accessed to control the logic circuit corresponding to that function. In other words, the application program recognizes a register space specific to the function. In contrast, even if a configured logic circuit is the same, the device allocates physical addresses of a plurality of registers accessed to control the logic circuit so as to be different for each partial reconfiguration unit. In other words, the device recognizes a register space specific to a partial reconfiguration unit. In such a case, if a logic circuit for a particular function is configured in an arbitrary partial reconfiguration unit, a register space recognized by a program that uses that function and a specific register space allocated to the partial reconfiguration unit in which the logic circuit of that function is configured will cease to match. As a result, by performing free-location partial reconfiguration of a logic circuit, an appropriate register of a partial reconfiguration unit from an address that an application program issues becomes inaccessible.

SUMMARY OF THE INVENTION

According to one aspect of the present invention, there is provided an information processing apparatus comprising: a programmable circuit unit comprising a partial reconfiguration unit for which, using configuration data corresponding to a respective function, a partial reconfiguration of a logic circuit corresponding to the function is possible; a storage unit configured to be used by each of logic circuits configured in the partial reconfiguration unit; and a control unit configured to control a logic circuit that becomes an access destination, in accordance with receiving an access command, wherein the configuration data includes circuit information for configuring the partial reconfiguration unit so as to output a signal for identifying an address space in the storage unit used by the logic circuit corresponding to the configuration data, and the control unit compares an address space indicating the access destination of the access command with the signal that is output from the partial reconfiguration unit due to the partial reconfiguration unit being configured using the circuit information, and controls to set as an access destination the logic circuit configured in the partial reconfiguration unit outputting the signal matching the address space indicating the access destination of the access command.

According to another aspect of the present invention, there is provided an information processing apparatus comprising: a programmable circuit unit comprising a partial reconfiguration unit for which, using configuration data corresponding to a respective function, a partial reconfiguration of a logic circuit corresponding to the function is possible; a storage unit configured to be used by each of logic circuits configured in the partial reconfiguration unit; and a control unit configured to control a logic circuit that becomes an access destination, in accordance with receiving an access command, wherein the configuration data includes circuit information for configuring the partial reconfiguration unit so as to output an identification signal for identifying the logic circuit that corresponds to the configuration data, the control unit compares an address space indicating the access destination of the access command with an address space associated with the identification signal output from the partial reconfiguration unit due to the partial reconfiguration unit being configured using the circuit information, and controls to set as an access destination the logic circuit corresponding to the address space matching the address space indicating the access destination of the access command.

According to another aspect of the present invention, there is provided an information processing apparatus comprising: a programmable circuit unit comprising a partial reconfiguration unit for which, using configuration data corresponding to a respective function, a partial reconfiguration of a logic circuit corresponding to the function is possible; a first storage unit configured to be used by each of logic circuits configured in the partial reconfiguration unit; and a control unit configured to control a logic circuit that becomes an access destination in accordance with receiving an access command, a second storage unit configured to accept and store information of an address space in the first storage unit that is used by each of logic circuits that are reconfigurable in the partial reconfiguration unit; wherein the control unit compares an address space indicating the access destination of the access command with the address space stored in the second storage unit, and controls so as to set as an access destination a logic circuit matching the address space indicating the access destination of the access command.

According to another aspect of the present invention, there is provided an information processing apparatus comprising a programmable circuit unit comprising a partial reconfiguration unit for which, using configuration data corresponding to a respective function, a partial reconfiguration of a logic circuit corresponding to the function is possible; and a storage unit configured to be used by each of logic circuits configured in the partial reconfiguration unit; and a control unit configured to control a logic circuit that becomes an access destination, in accordance with receiving an access command, a storage unit configured to accept and store, as an LUT, information of an address space in the storage unit that is used by each of logic circuits that are reconfigurable in the partial reconfiguration unit; wherein the control unit uses the LUT to identify a logic circuit corresponding to an address space indicating the access destination of the access command, and controls to set as an access destination the identified logic circuit.

According to another aspect of the present invention, there is provided an information processing apparatus comprising a programmable circuit unit comprising a partial reconfiguration unit for which, using configuration data corresponding to a respective function, a partial reconfiguration of a logic circuit corresponding to the function is possible; and a storage unit configured to be used by each of logic circuits configured in the partial reconfiguration unit; and a reconfiguration unit configured to use the configuration data to cause a logic circuit to be configured in the partial reconfiguration unit; an identification unit configured to identify an address space in the storage unit that corresponds to the partial reconfiguration unit in which the logic circuit is configured; and a control unit configured to designate as an access destination the logic circuit configured in the partial reconfiguration unit by using the address space identified by the identification unit to designate an access destination of an access command.

By virtue of the present invention, even if a function is configured in an arbitrary partial reconfiguration unit, it is possible to cause a register space allocated to the partial reconfiguration unit and a register space recognized by a program to match, and to access an appropriate register of the partial reconfiguration unit.

Further features of the present invention will become apparent from the following description of exemplary embodiments (with reference to the attached drawings).

BRIEF DESCRIPTION OF THE DRAWINGS

FIG. 3 is a view for illustrating a relationship between a job and a partially reconfigured function.

FIGS. 17A, 17B, 17C, and 17D are views for explaining detail of an LUT unit in accordance with the fourth embodiment.

DESCRIPTION OF THE EMBODIMENTS

Hereinafter, embodiments for working the present invention are explained using drawings. Note that, in the following embodiments, explanation is given by taking an image processing apparatus as an example, but limitation is not made to this, and it may be another information processing apparatus.

First Embodiment

[Image Processing Apparatus Configuration]

Figure 1:
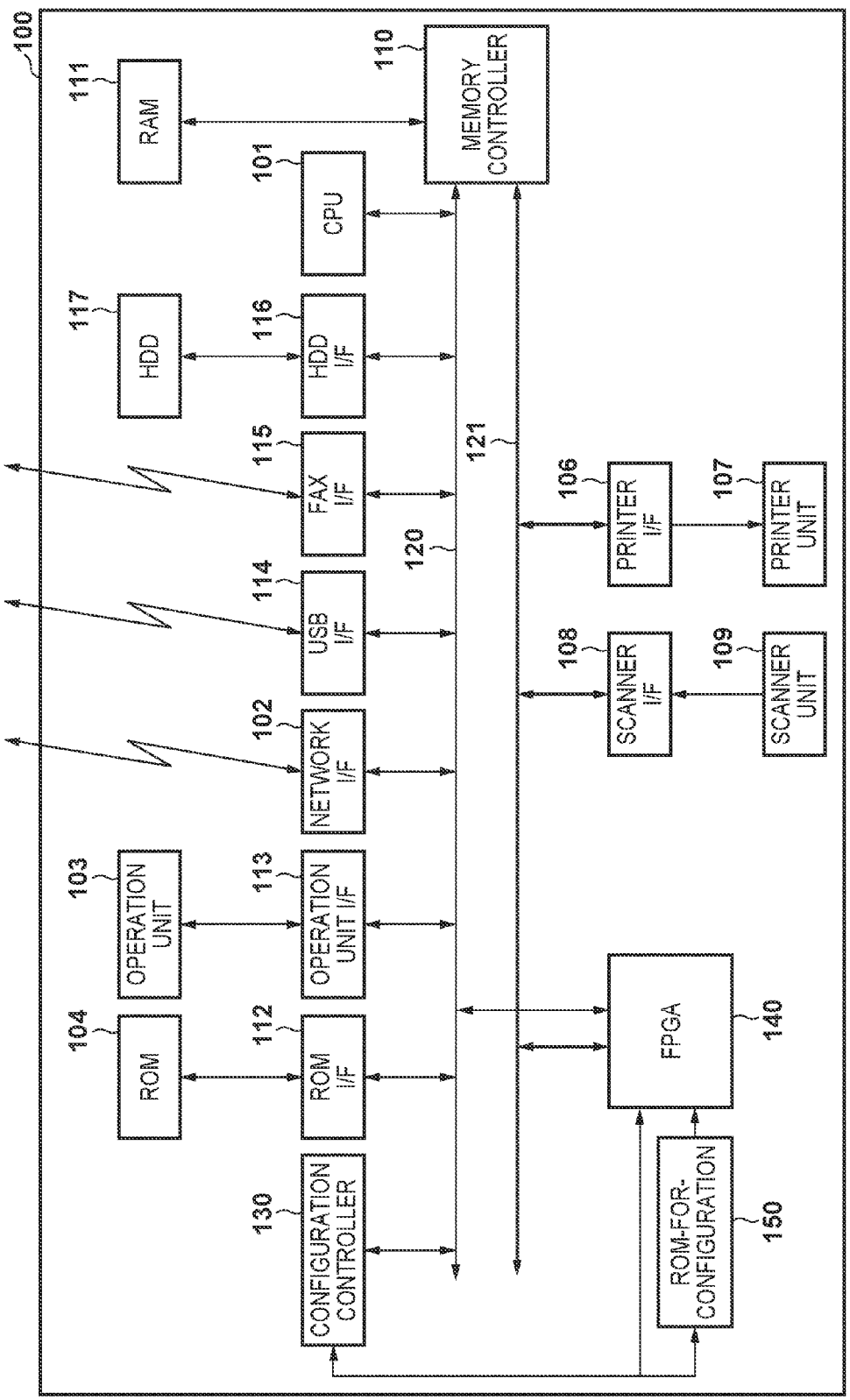
FIG. 1 is a view for illustrating an example configuration of an image processing apparatus.

FIG. 1 is a view for illustrating an example configuration of an image processing apparatus 100 according to a first embodiment. The image processing apparatus 100 comprises an operation unit 103 by which a user performs various operations, a scanner unit 109 that reads image information in accordance with an instruction from the operation unit 103, and a printer unit 107 that prints image data on a print medium such as paper. The scanner unit 109 comprises a CPU (not shown) that controls overall operation of the scanner unit 109, and an illumination lamp and a scanning mirror (not shown) for performing original scanning. The printer unit 107 comprises a CPU (not shown) that controls overall operation of the printer unit 107, and a photosensitive drum and a fixing unit (not shown) for performing image formation and fixing.

The image processing apparatus 100 is provided with a CPU 101, a ROM 104, a RAM 111, and a memory controller 110. The CPU 101 comprehensively controls operation of the image processing apparatus 100 on the whole, and executes control software for controlling each unit that comprises the image processing apparatus 100. The ROM 104 is a nonvolatile storage unit, and stores a program that the CPU 101 executes. The RAM 111 is a volatile storage unit, and functions as a system work memory that is used to cause operation of a program or the like that the CPU 101 executes, or as an image memory for temporarily storing image data. The memory controller 110 controls the RAM 111 as well as write and read operations with respect to the RAM 111. The memory controller 110 is connected to a system bus 120 and an image bus 121, and controls access to the RAM 111.

The image processing apparatus 100 has an FPGA 140 which configures an image processing circuit or the like as a reconfigurable device. The FPGA 140 is dynamically rewritable and can be partially rewritten. In other words, while a circuit configured in a portion of a reconfiguration unit of the FPGA 140 is operating, it is possible to reconfigure a separate circuit in a separate portion that does not overlap with that the portion that the circuit occupies. Note that, in the present embodiment, explanation is given of an FPGA as an example of a reconfigurable device (a programmable circuit unit), but the configuration may be taken in which a reconfigurable device other than an FPGA is connected.

The image processing apparatus 100 has a configuration controller 130 and a ROM-for-configuration 150. The configuration controller 130 controls FPGA circuit configuration (configuration), under the control of the CPU 101. The ROM-for-configuration 150 stores logic circuit configuration information (configuration data) for configuring in the FPGA 140. Details of the configuration data stored here are explained later by using FIG. 4.

The image processing apparatus 100 also has a scanner I/F 108 in which image data from the scanner unit 109 is input, and a printer I/F 106 that outputs image data to the printer unit 107. The FPGA 140, the scanner I/F 108, and the printer I/F 106 are connected to the image bus 121, which is for transferring image data.

The image processing apparatus 100 performs communication (transmission/reception) with a general-purpose computer (not shown) on a network, via a network I/F 102. The image processing apparatus 100 performs communication (transmission/reception) with a general-purpose computer (not shown) that is connected to the image processing apparatus 100, via a USB I/F 114. In addition, the image processing apparatus 100 is connected to a public circuit network via a FAX I/F 115, and performs communication (transmission/reception) with another image processing apparatus or facsimile apparatus (not shown). The image processing apparatus 100 has a ROM I/F 112 and the system bus 120. The ROM I/F 112 controls an operation for reading from the ROM 104 a program that the CPU 101 executes. The system bus 120 connects the CPU 101, the network I/F 102, the operation unit 103, the ROM I/F 112, the configuration controller 130, and the FPGA 140 to each other. The CPU 101 performs setting of parameters of the FPGA 140, the scanner I/F 108, and the printer I/F 106, via the system bus 120.

[Configuration Associated With Partial Reconfiguration]

Figure 2:
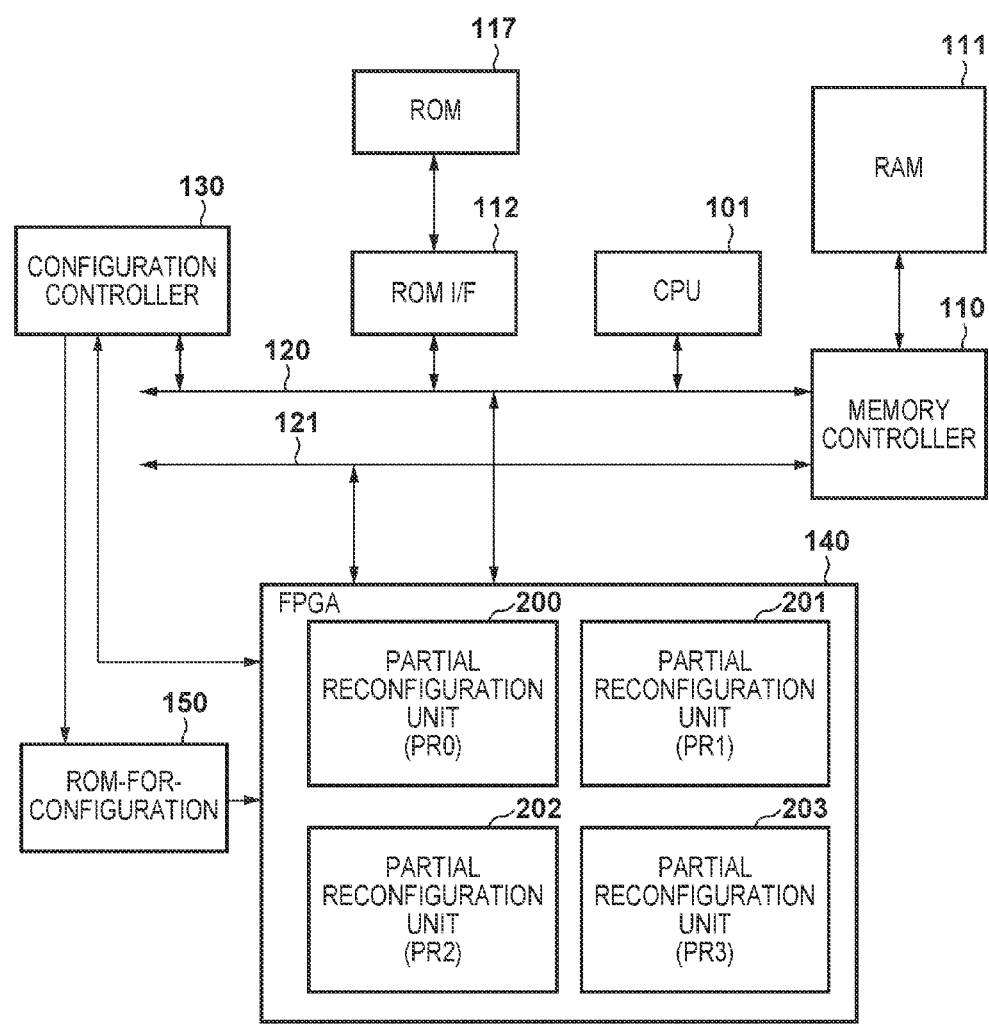
FIG. 2 is a view for illustrating a configuration in accordance with dynamic partial reconfiguration of an image processing apparatus according to a first embodiment.

Next, using FIG. 2, explanation is given for a configuration in relation to partial reconfiguration in the present embodiment. The CPU 101, the configuration controller 130, the ROM-for-configuration 150, the FPGA 140, the memory controller 110, and the ROM I/F 112 are as previously described using FIG. 1.

The FPGA 140, internally, is provided with a partial reconfiguration unit 200 (PR0), a partial reconfiguration unit 201 (PR1), a partial reconfiguration unit 202 (PR2), and a partial reconfiguration unit 203 (PR3). A logic circuit is configured in each of these partial reconfiguration units, and in the present embodiment, any one of a plurality of logic circuits can be configured in one partial reconfiguration unit.

For each partial reconfiguration unit, it is possible to dynamically rewrite an image processing circuit or the like. Note that a partial reconfiguration unit is also referred to as "PR" hereinafter. Note that, in the present embodiment, the number of partial reconfiguration units is given as four, but limitation is not made to this configuration, and it may be increased or decreased.

In the present embodiment, types of functions configured in each PR are illustrated in FIG. 3. In the present embodiment, explanation is given of an example of configuring a circuit having an image processing or a compression/decompression function in a PR, but limitation is not made to this, and a circuit other than these may be configured in a PR. FIG. 3 illustrates an example of a relation between functions configured in the FPGA 140 when the image processing apparatus 100 executes a job. Below, explanation is given, for each job type given in FIG. 3, of an overview of an operation and configured circuit thereof. The below operations are controlled by programs executed by the CPU 101.

(Copy Job)

In a copy job, with respect to image data generated in accordance with an original being read by the scanner unit 109, image processing by a circuit comprising an image-processing-function-for-reading 302 configured in any of the PR0 to the PR3 is performed, and buffering to a predetermined region of the RAM 111 is performed. Next, for the image data buffered in the RAM 111, image processing by a circuit comprising an image-processing-function-for-printing 303 configured in any of the PR0 to the PR3 is performed. Thereafter, the image data, for which image processing has been performed, is transferred to the printer unit 107 via the printer I/F 106.

The image-processing-function-for-reading 302 is configured from a segmentation processing unit, a color space conversion unit, a filter processing unit, and an undercolor removal processing unit, or the like. The segmentation processing unit determines an image region by detecting a character region from an input image, and generates an image region signal used in subsequent image processing. The table conversion processing unit converts luminance data of read image data into density data, in accordance with a table conversion. The filter processing unit for example performs computation by a digital spatial filter that accords to an objective, such as edge enhancement. The undercolor removal processing unit removes a background color if image data read from an original having a light color background is sent.

The image-processing-function-for-printing 303 is comprised from a color space conversion unit, a correction processing unit, and an error diffusion processing unit. The color space conversion unit performs a CMYK conversion of RGB data, in accordance with an output characteristic of the image processing apparatus. The correction processing unit performs a density conversion of the image data. The error diffusion processing unit converts the input image data into N values by comparing it to predetermined threshold values, and performs halftoning processing by diffusing a difference, between the input image data at this time and the threshold values, with respect to surrounding pixels for which further conversion-into-N-values processing is to be performed.

(Print Job)

In a print job, PDL data transmitted from a host computer or the like via a network is received via the network I/F 102, and temporarily buffered in a predetermined region of the RAM 111. The CPU 101 analyzes the buffered the PDL (Page Description Language) data, generates a rendering command group, and buffers it in a predetermined region of the RAM 111. As for the buffered rendering command group, RIP processing in accordance with a circuit comprising an RIP (Raster Image Processor) processing function 318 that is configured in any of the PR0 to the PR3 is performed, and image data is rendered in a predetermined region of the RAM 111. As for the rendered image data, image processing in accordance with a circuit comprising the image-processing-function-for-printing 303 that is configured in any of the PR0 to the PR3 is performed, and thereafter, the rendered image data is transferred to the printer unit 107 via the printer I/F 106.

(FAX Job)

In a FAX job, FAX data transmitted from an external public circuit network is received via the FAX I/F 115, and buffered in a predetermined region of the RAM 111. From the received FAX data, JBIG (Joint Bi-level Image Experts Group) compressed data is extracted based on header information of the FAX data. With respect to the compressed data, JBIG decompression processing in accordance with a circuit comprising a JBIG decompression processing function 322 configured in any of the PR0 to the PR3 is performed. Thereafter restored FAX image data is buffered in a predetermined region of the RAM 111. As for the buffered FAX image data, image processing for FAX in accordance with a circuit comprising an image-processing-function-for-FAX 306 that is configured in any of the PR0 to the PR3 is performed, and the data is stored in a predetermined region of an HDD 117. The image-processing-function-for-FAX 306 includes smoothing processing, image processing that performs resolution conversion from a facsimile standard resolution to a print resolution of the image processing apparatus 100, or the like.

(SEND Job)

In a SEND job, with respect to image data generated in accordance with an original being read by the scanner unit 109, image processing by a circuit comprising the image-processing-function-for-reading 302 configured in any of the PR0 to the PR3 is performed, and buffering to a predetermined region of the RAM 111 is performed. Next, to efficiently transmit image data to an external general-purpose computer (not shown) via the network I/F 102, JPEG compression processing by a circuit comprising a JPEG compression function that is configured in any of the partial reconfiguration units 200-203 is performed on the image data. Thereafter, the compressed data is transmitted to the external general-purpose computer (not shown), via the network I/F 102.

This concludes the explanation of the relationship between jobs and functions. In the present embodiment, an example of using two functions for each job was illustrated, but of course limitation is not made to this, and three or more functions may be performed for one job type. In addition, details of functions necessary for job execution is also not limited to those illustrated in FIG. 3.

The present invention relates to a method to solve a problem when a function is configured in an arbitrary one of the PR0 to the PR3, and the PR configuring the function then changes. In the present embodiment, explanation is given of an example of a case in which the FPGA 140 is provided with four PRs, and there are six functions—A, B, C, D, E, and F—that configure a PR. In the present embodiment, the number of PRs is set as four and the number of functions is set as six, but details of the functions/the number of the functions are not limited to this.

[Configuration Data Configuration]

Figure 4:
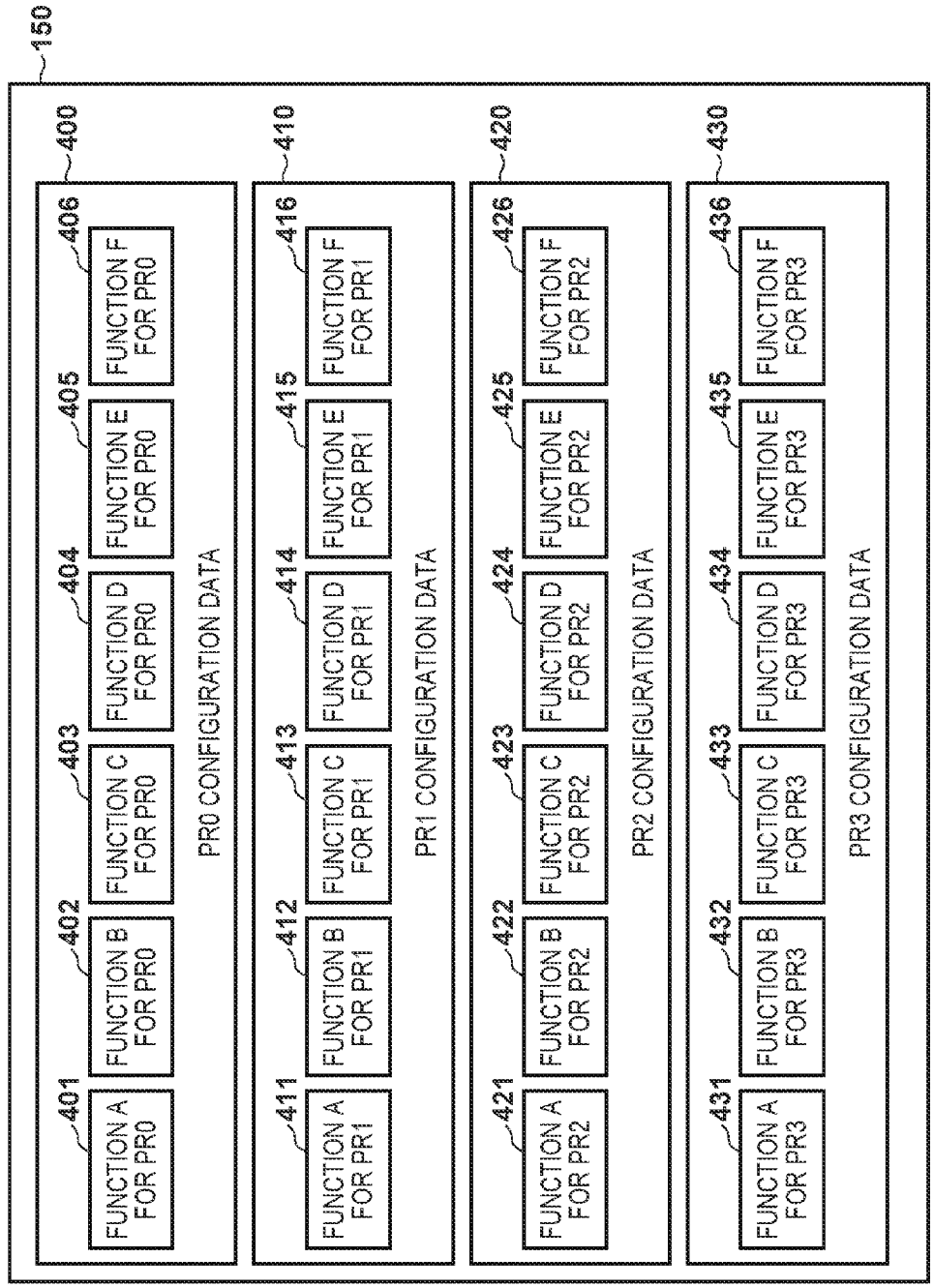
FIG. 4 is a view for illustrating an example of a method of storing circuit information.

FIG. 4 is an example of configuration data that is configured in each of the PR0 to the PR3 of the FPGA 140 and is stored in the ROM-for-configuration 150. A plurality of pieces of configuration data necessary for partial reconfiguration is stored in the ROM-for-configuration 150. PR0 configuration data 400 represents configuration data that can be configured in the PR0. Configuration data 401 is data for configuring a circuit of the function A in the PR0. Similarly, each of configuration data 402 to 406 represents data for configuring circuit configurations of the functions B to F in the PR0.

PR1 configuration data 410 represents configuration data that can be configured in the PR1. The PR1 configuration data 410 also stores configuration data of six functions—the functions A, B, C, D, E, and F—and it is possible to configure by switching the six functions in the partial reconfiguration unit (PR1) 202.

PR2 configuration data 420 represents configuration data that can be configured in the PR2. The PR2 configuration data 420 also stores configuration data of six functions—the functions A, B, C, D, E, and F—and it is possible to configure by switching the six functions in the partial reconfiguration unit (PR2) 203.

PR3 configuration data 430 represents configuration data that can be configured in the PR3. The PR3 configuration data 430 also stores configuration data of six functions—the functions A, B, C, D, E, and F—and it is possible to configure by switching the six functions in PR3.

As described above, it is necessary to prepare configuration data corresponding to each function, for each PR. For example, when configuring a circuit configuration of the function A for the PR0, the configuration data 401 of the function A for the PR0 is used, and when configuring a circuit configuration of the function A for the PR1, the configuration data 402 of the function B for the PR1 is used. In this way, even when implementing the same function, it is necessary to prepare configuration data that is different according to each configuration location (partial reconfiguration unit).

Figure 5:
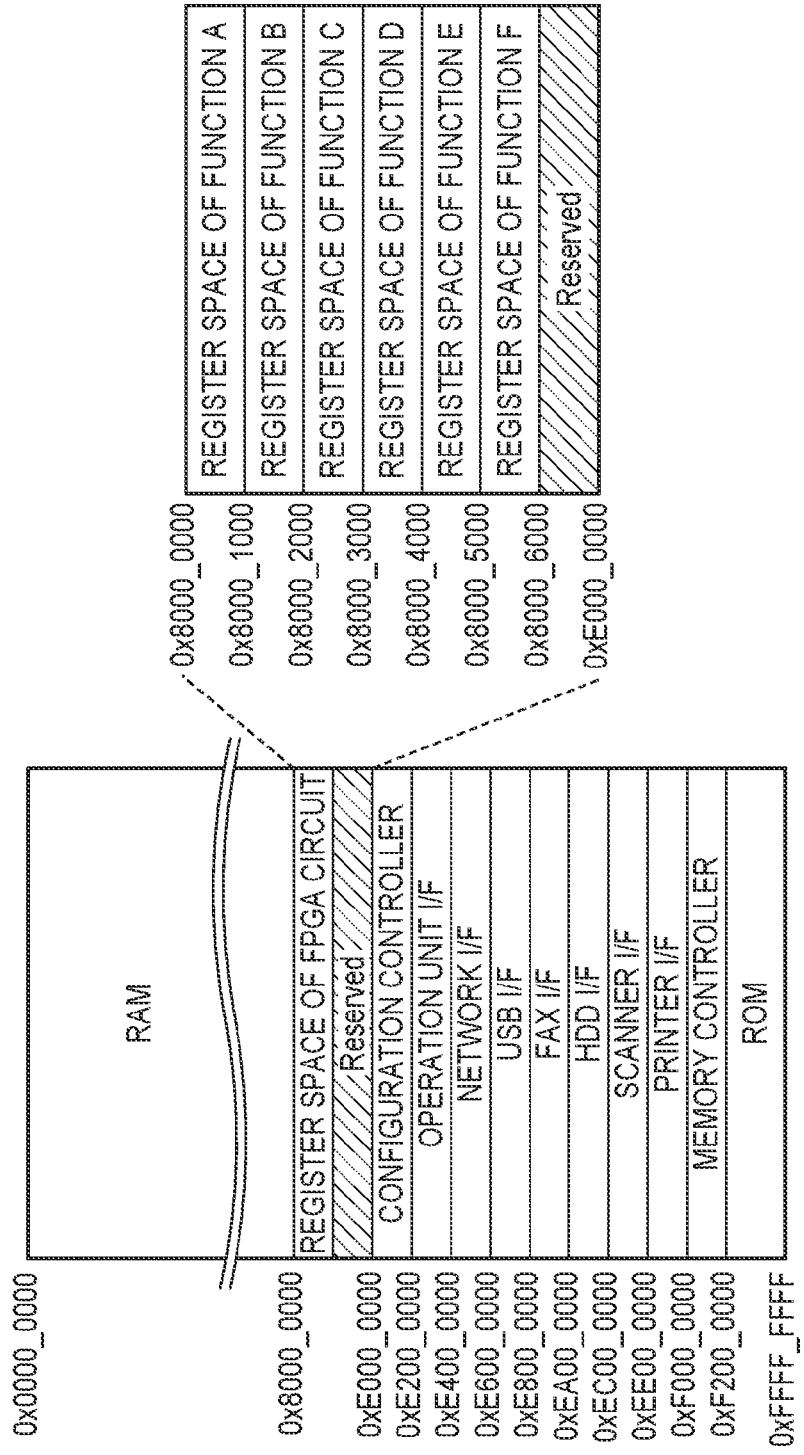
FIGS. 5A and 5B are views for illustrating an example of an address map in accordance with the first embodiment.

FIGS. 5A and 5B are an example of an address map that illustrates a relationship between each block and access addresses for when the CPU 101 accesses a block such as one of the I/Fs connected to the system bus 120 or the FPGA 140. FIG. 5A represents the image processing apparatus 100 on the whole. FIG. 5B in particular illustrates details of a register space of an image processing circuit configured in the FPGA 140. With respect to functions A to F that can be configured in the FPGA 140, for example as in the register space illustrated in FIG. 5B, four kilobytes are mapped from "0x8000_0000" for each of these. Note that the "0x" added to a value that illustrates a register space indicates that the value is a hexadecimal expression.

As described above, while conventionally each PR is associated with a specific register space, for a program that controls each PR, a register space is determined depending on a function (a type of a logic circuit to access) of a circuit. Therefore, by a function being reconfigured into any of the plurality of PRs (free-location), there is the problem of a register space allocated to the PR not matching a register space that the program recognizes. A plurality of embodiments hereinafter, including the present embodiment, solve this problem.

[FPGA Configuration]

Figure 6:
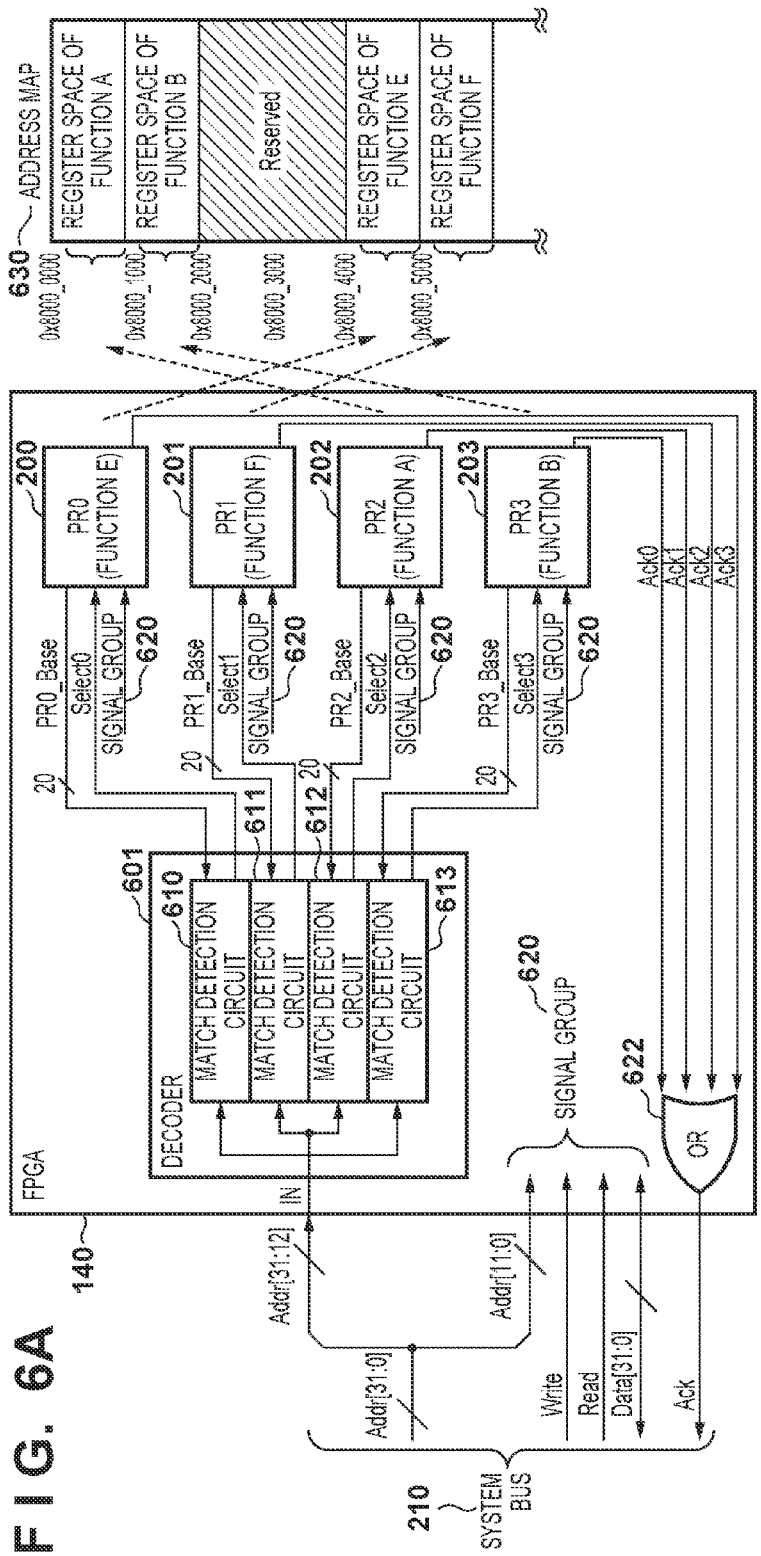
FIGS. 6A and 6B are views for explaining detail of an FPGA in accordance with the first embodiment.

FIG. 6A is the view for explaining detail of the FPGA 140 according to the present embodiment. Here, as an example, the function E in the PR0, the function F in the PR1, the function A in the PR2, and the function B in the PR3 are configured by the configuration data. The relation between these dynamically changes each time reconfiguration is performed, and limitation is not made to this configuration. With FIG. 6A, explanation is given of a method of decoding an address when the CPU 101 accesses, via the system bus 120, each PR in the FPGA 140 configured as described above. Accordingly, the configuration controller 130, interfaces with the image bus 121, interfaces with the ROM-for-configuration 150 and circuit units in relation to these are omitted from FIG. 6A.

The CPU 101 issues access commands with respect to registers. A write command that writes data to a specific register in the FPGA 140, and a read command that reads data from a specific register in the FPGA 140 may be given as access commands. The system bus 120 performs communication that includes Addr[31:0], a Write signal, and a Read signal that are output from the CPU 101, as well as an Ack signal and a bi-directional Data[31:0] signal that are returned from the FPGA 140. The Write signal indicates the generation of a write command, and the Read signal indicates the generation of a read command. The Ack signal is an acknowledge signal that notifies the CPU 101 that a block designated as an access destination by Addr[31:0] has received a write command or a read command. For example, a write command is started by the CPU 101 enabling the Write signal while outputting an Addr[31:0] signal and a Data[31:0] signal, and terminates in accordance with a response of an Ack signal. In addition, a read command is started by the CPU 101 enabling the Read signal while outputting an Addr[31:0] signal, and terminates by the CPU 101 obtaining Data[31:0] at a time of response of the Ack signal. Detail is explained later using a timing chart.

The FPGA 140 further includes a decoder 601 and an OR 622, which are other than the four previously described PR0 to the PR3. For the decoder 601 and the OR 622, circuits are configured by the configuration controller 130 when a power source becomes on, and thereafter they belong to a static region in which reconfiguring is not performed. In addition, wiring that connects each block in the FPGA 140 belongs to a static region.

The decoder 601 is an address decoder that is configured by including match detection circuits 610, 611, 612, and 613. The match detection circuit 610 compares an upper 20 bits (Addr[31:12]) of the system bus 120 and a PR0_Base signal (20 bits) output from the partial reconfiguration unit 200. If these match, the match detection circuit 610 is a logic circuit that outputs a selection signal Select0 to the PR0 (the partial reconfiguration unit 200). Values of Base signals output from each the partial reconfiguration units are as illustrated in FIG. 6B.

Figure 7:
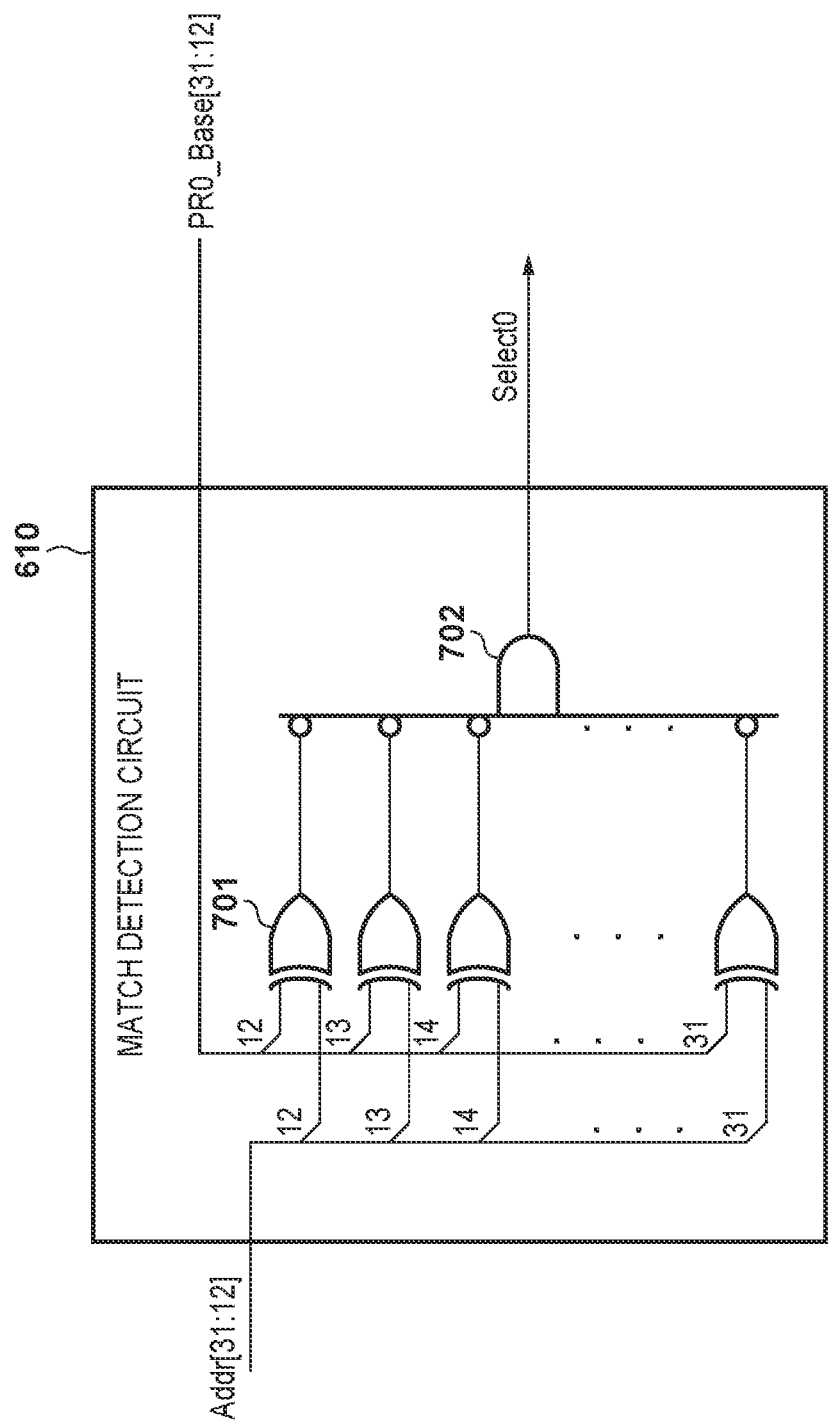
FIG. 7 is a view for explaining detail of a match detection circuit in accordance with the first embodiment.

Details of the match detection circuit 610 are illustrated in FIG. 7. For the Addr[31:12] and the PR0_Base input to the match detection circuit 610, bits corresponding to each other are compared by XOR gates (an exclusive logic device). Here, because a signal is 20 bits, 20 XOR gates are prepared. If the value of each bit is equal, an exclusive logic device 701 outputs "0". Because each output is the input of an AND gate 702 having negative logic input, if all inputs are "0", in other words when values of Addr[31:12] and PR0_Base match, the match detection circuit 610 outputs "1" as Select0. Because other match detection circuits 611, 612, and 613 are also of the same logic circuit, explanation thereof is omitted.

Figure 8:
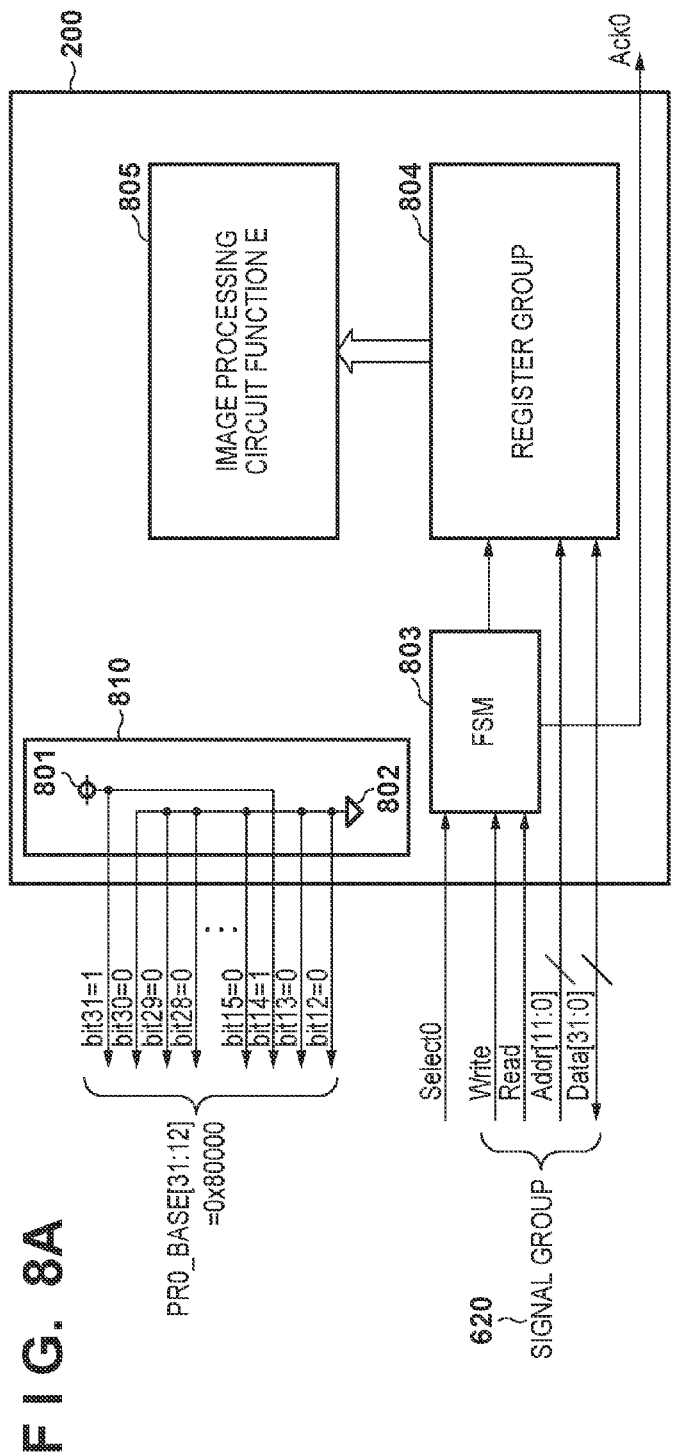
FIGS. 8A and 8B are views for explaining an internal configuration of a partial reconfiguration unit in accordance with the first embodiment.

The internal configuration of the PR0 (the partial reconfiguration unit 200) is illustrated in FIG. 8A. The PR0 includes a PR0_Base output unit 810, a finite state machine (FSM) 803, a register group 804, and an image processing circuit 805. In the present embodiment, these circuits and the wiring information are all included in the configuration data 405 of the function E for the PR0.

The PR0_Base output unit 810 does not have a circuit element, and by connecting each signal line of the 20 lines that configure the PR0_Base signal to a power source 801 or a ground 802, a predetermined value, which is explained later using FIG. 8B, is continuously output as the PR0_Base signal. Note that by configuring the PR0_Base output unit 810, which is for holding output of the PR0_Base signal, circuit resources that are necessary are insignificant. Here, the PR0_Base signal indicates a base address of a register space of a PR to which it belongs to. As illustrated in the address map of FIG. 5B, a register access space corresponding to the function E configured in the PR0 is the space of 0x8000_4000 to 0x8000_4FFF. Therefore, the PR0_Base signal is the upper 20 bits of the base address 0x8000_4000, in other words "0x80004". Note that the PR0_Base signal for when another function is configured in the PR0 is a value according to that function. A relationship between functions configured in the PR0 and the value of PR0_Base output when the respective function is configured is illustrated in the table of FIG. 8B.

The same is true for the PR1, the PR2, and the PR3. For example, because PR1_Base, PR2_Base, and PR3_Base of FIG. 6A illustrate base addresses of the function F, the function A, and the function B configured in respective PRs, they are respectively 0x80005, 0x80000, and 0x80001. This is summarized in the table of FIG. 6B. If Addr[31:12] of the system bus 120 matches any of PR0_Base to Pb 3_Base, the decoder 601 outputs a selection signal (Select0 to Select3) to the corresponding PR. As a result, the register space of each function is an address map 630 illustrated in FIG. 6A. In other words, the register spaces of the functions E, F, A, and B configured in the FPGA 140 match those in FIG. 5B.

The explanation of FIG. 8A is returned to. The FSM 803 is a finite state machine that, when Select0 is enabled ("1") and an assert of a Write signal or a Read signal is received, instructs the register group 804 for a write or a read, and also performs control to return an Ack0 signal. Upon receiving a write instruction from the FSM 803, the register group 804 sets a 32 bit value of the Data[31:0] signal in a register identified by Addr[11:0] (12 bits) of a signal group 620. Also, when a read instruction is received from the FSM 803, the register group 804 outputs a value of a register identified by Addr[11:0] (12 bits) of the signal group 620 to the Data[31:0] signal.

The image processing circuit 805 is an image processing circuit for which operation is controlled by values set in registers in the register group 804. For example, if a JPEG compression processing function is configured as the function E in the image processing circuit 805, the register group 804 includes the following registers. Specifically, there are an input address register that indicates a storage address of original data, an output address register that indicates a compressed data output destination address, a width register that indicates an image size, a height register, and an activation register that causes processing to start in accordance with the writing of data. The CPU 101 writes data to the activation register after setting the input address register, the output address register, the width register, and the height register. The image processing circuit 805 reads, via an image bus (not shown), image data from an address in the RAM 111 indicated by the input address register, performs compression processing, and stores data after compression to an address in the RAM 111 indicated by the output register.

Regarding the PR1, the PR2, and the PR3, these are also similar except in points that configured functions are different, and accordingly the values of PR1_Base, PR2_Base, and PR3_Base that are output change as illustrated in the table of FIG. 8B.

[Timing Chart]

Figure 9:
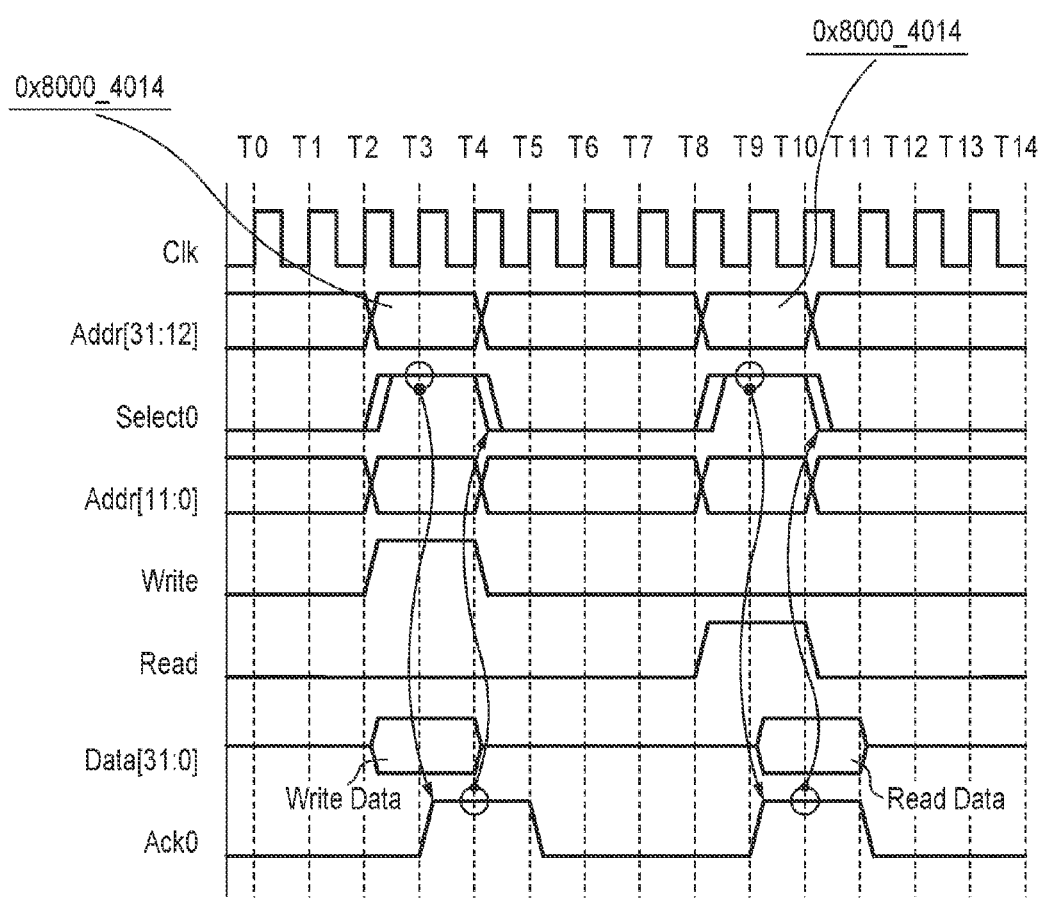
FIG. 9 is a timing chart for times at which commands in accordance with the first embodiment occur.

FIG. 9 is a timing chart that expresses operations for when the CPU 101 issues a write command and a read command to the PR0. Below, operation in the FPGA 140 in time series according to the timing chart is explained.

From a time T0 to a time T2 the Write signal and the Read signal are both not active; in other words there are idle cycles. At the time T2, the CPU 101 asserts a Write signal, and starts a cycle of a write command. At the same time, the CPU 101 outputs an address that indicates an access destination to Addr[31:0]. As described above, the CPU 101 recognizes access destinations that are fixed for each function, and here an address of an address space corresponding to the function E is designated. Here, for example Addr[31:0]=0x8000_4014. The upper 20 bits of the output Addr[31:0] (Addr[31:12]) are respectively input to the match detection circuits 610, 611, 612, and 613 in the decoder 601. Each input Addr is then respectively compared to PR0_Base, PR1_Base, PR2_Base, and PR3_Base input to respective match detection circuits from the PR0, the PR1, the PR2, and the PR3. In other words, to identify addresses, the same value (the upper 20 bits of Addr[31:0]) is input to the match detection circuits 610, 611, 612, and 613 in the decoder 601. Here, because the register spaces of the PR0 to the PR3 are mutually exclusive, a match will not be detected for a plurality of match detection circuits, and a match is only detected for one match detection circuit. Here, because Addr[31:12] and PR0_Base match, only the match detection circuit 610 outputs Select0 ("1").

At the time T3, because the Write signal is asserted and Select0 is enabled ("1"), the FSM 803 recognizes a write access to the partial reconfiguration unit 200, and outputs Ack0. The Ack0 is further output to the CPU 101 as an Ack signal of the system bus 120, via the OR 622. Similarly, at the time T3, the FSM 803 notifies the write command reception to the register group 804.

The register group 804 accepts the previously described notification of the write command, and at a time T4 sets a value of Data[31:0] to a register in the register group 804 identified by Addr[11:0]. At the time T4 the CPU 101 detects the Ack signal, de-asserts the Write signal, and indicates the termination of the write command. At the time T5 the FSM 803 detects the de-assertion of the Write signal, and de-asserts Ack0. Finally the system bus 120 returns to the idle state.

From the time T8, a cycle for a read command is indicated. At the time T8, the CPU 101 asserts a Read signal, and starts a cycle of a read command. At the time T9, because the Read signal is asserted and Select0 is enabled ("1"), the FSM 803 recognizes a read access to the PR0, and outputs Ack0. The Ack0 is further output to the CPU 101 as an Ack signal of the system bus 120, via the OR 622. Similarly, at the time T9, the FSM 803 notifies the write command reception to the register group 804.

The register group 804 accepts the previously described notification of the read command, and at a time T9 outputs a value of a register in the register group 804 identified by Addr[11:0] to Data[31:0]. At a time T10 the CPU 101 detects the Ack signal, de-asserts the Read signal, and indicates the termination of the read command. At the time T11, the FSM 803 detects the de-assertion of the Read signal, and in addition to de-asserting Ack0, stops output of register values as Data[31:0]. With the above, the system bus 120 returns to the idle state.

[Process Flow]

Figure 10:
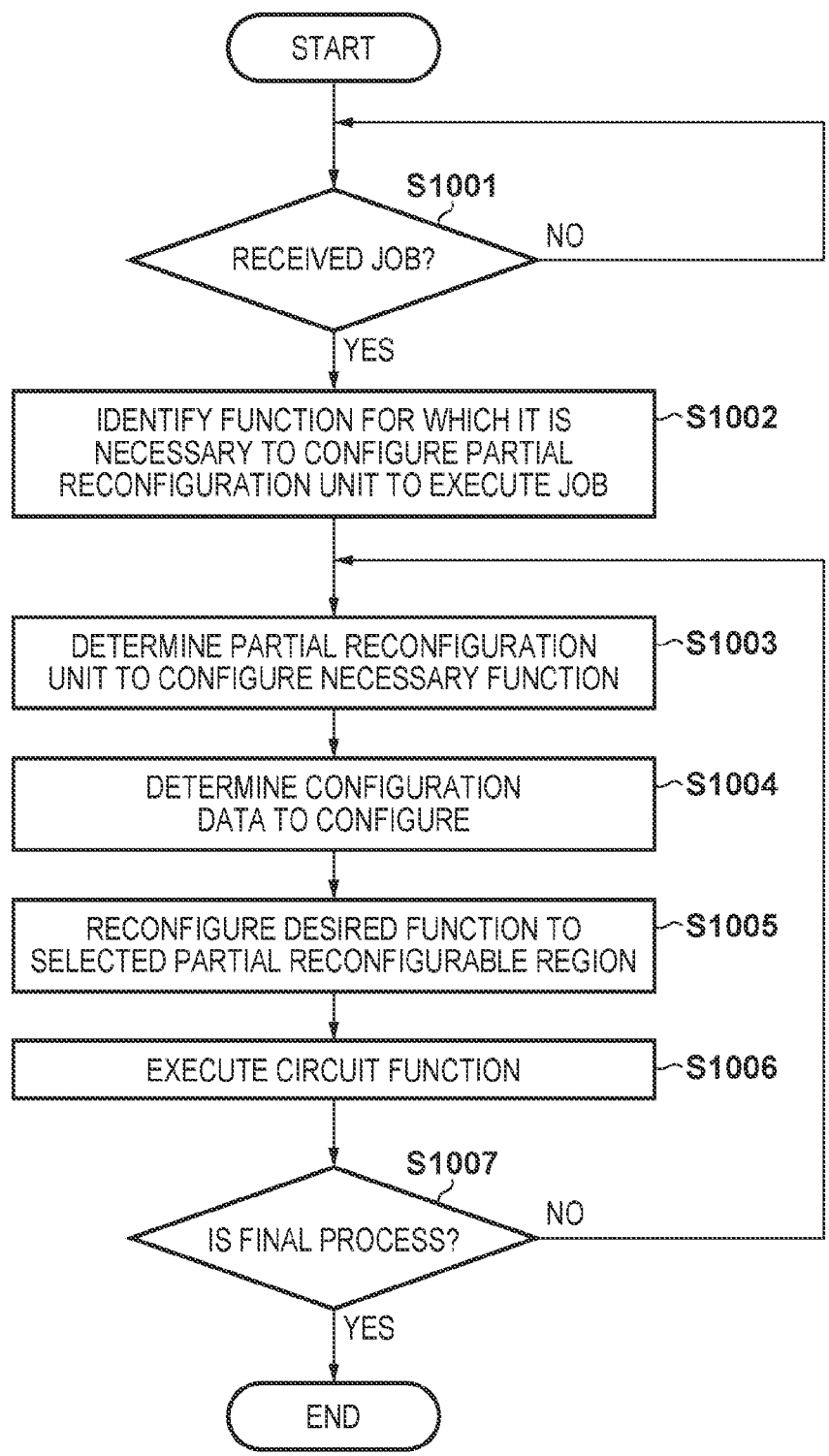
FIG. 10 is a flowchart of control processing according to the first embodiment.

FIG. 10 is a flowchart expressing job execution processing control of the image processing apparatus 100 according to the present embodiment. Note that the flowchart of FIG. 10 is executed by the CPU 101.

In step S1001, the CPU 101 determines whether the image processing apparatus 100 has received various jobs (a copy job, a print job, a FAX job, a SEND job, or the like). If the image processing apparatus 100 has received a job (YES in step S1001), the processing proceeds to step S1002.

In step S1002, the CPU 101 identifies a function for which it is necessary to configure the FPGA 140 to execute the received job. The method of identifying the function here, for example, can be identifying by referring to the table of FIG. 3. In step S1003, the CPU 101 determines which of the PR0 to the PR3 to configure a circuit comprising the necessary function in.

In step S1004, based on the PR in which to reconfigure determined in step S1003, the CPU 101 identifies configuration data to load to the PR from the configuration data stored in the ROM-for-configuration 150. For example, in the example of FIG. 4, if reconfiguring the circuit of the function E in PR4, configuration data 435, which is the configuration data of the function E for the PR4, is determined as the configuration data to load. Here, the configuration data 435 includes circuit information of the PR0_Base output unit 810, which outputs the address 0x80004 of the register space corresponding to the function E.

In step S1005, the CPU 101 uses the configuration controller 130 to reconfigure the PR. For example, by loading the configuration data 435 of the function E to the PR4, the PR4 is reconfigured as a circuit that comprises the function E. Furthermore, in the present embodiment, the circuit of the PR0_Base output unit 810 is also configured.

In step S1006, the CPU 101 uses the reconfigured PR to execute the function necessary for job execution. These steps include various register settings for processing, register access for activation, a processing completion wait operation, or the like.

Thus processing according to one function terminates. In step S1007, the CPU 101 determines whether the are process that ended is the final process for the accepted job. If not the final process (NO in step S1007), the processing returns to step S1003, and the next function is executed. If it is the final process (YES in step S1007), this processing flow terminates.

Thus, even if a function is configured in an arbitrary PR, it is possible to provide a system in which the register space allocated to that PR and a register space that a program recognizes match. As a result, even for an apparatus comprising a circuit having a partial reconfiguration unit, it is possible to appropriately access the register space.

Second Embodiment

In the first embodiment, each PR (the partial reconfiguration units 200-203) output a base address of 20 bits as information indicating its own register space. However, outputting only a number of bits necessary to identify a function from each PR and converting this into a 20-bit base address in the decoder 601 can achieve that it is possible to economize wiring resources (a configuration of the Base output unit) of the FPGA 140. In the present embodiment, explanation is given for this configuration.

Figures 11A, 11B:
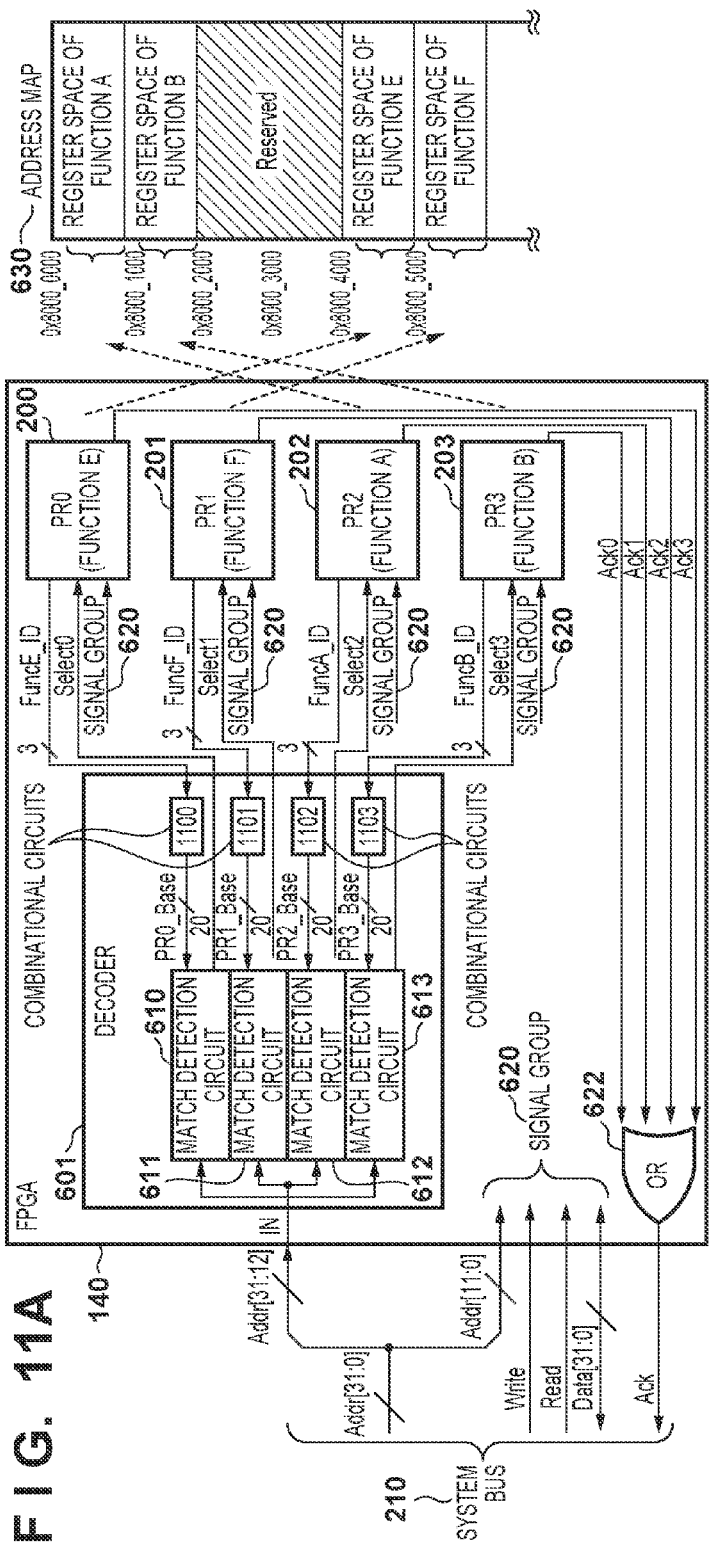
FIGS. 11A and 11B are views for explaining detail of an FPGA in accordance with a second embodiment.

FIG. 11A is the view for explaining detail of the FPGA 140 according to the present embodiment. Similarly to in the first embodiment, the logic circuits are configured by the configuration data of the function E in the PR0, the function F in the PR1, the function A in the PR2, and the function B in the PR3 being loaded.

The difference with FIG. 6A of the first embodiment is a point that each PR outputs an identifying identification signal that indicates its own function. For example, because the function E is configured, the PR0 outputs a FuncE_ID that indicates the function E. Because there are six types of functions (the functions A to F) that can be configured in each partial reconfiguration unit, an identification signal for uniquely identifying each function can be expressed by three bits. For example, as illustrated in FIG. 11B, it is possible to allocate function identification signals values. Note that, the number of bits to express the identification signal increases/decreases in accordance with the number of reconfigurable functions Each identification signal is input to the combinational circuits 1100, 1101, 1102, and 1103, and each combinational circuit respectively outputs PR0_Base, PR1_Base, PR2_Base, and PR3_Base.

In the first embodiment, each piece of the configuration data includes circuit information of the Base output unit for outputting the address in the register space corresponding to the function. In contrast to these, in the present embodiment it includes circuit information of a portion for outputting the identification signal for identifying the function.

Figures 12A, 12B:
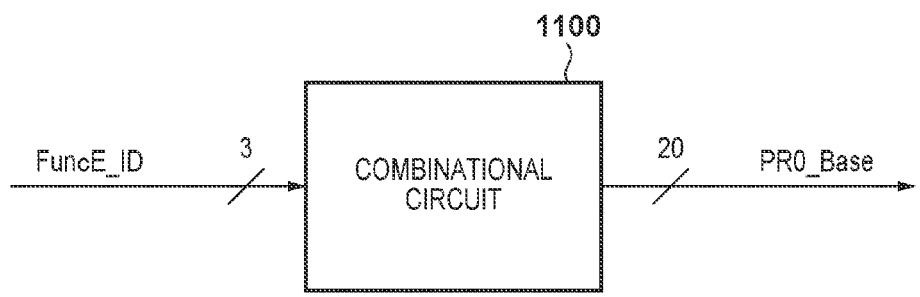
FIGS. 12A and 12B are views for explaining detail of a combinational circuit in accordance with a second embodiment.

FIG. 12A illustrates input and output of a combinational circuit 1100. In addition, FIG. 12B illustrates a truth table of the combinational circuit, and for example it is held in the ROM-for-configuration 150 or the like. In accordance with the input/output logic illustrated in FIG. 12B, the base address of a corresponding register space is output in accordance with a type of the function configured in the PR0. Generation of the combinational circuit that realizes the logic illustrated in the truth table is something that uses a conventional method, and a detailed explanation of the combinational circuit is omitted. Because the combinational circuits 1101, 1102, and 1103 are circuits having the same logical configuration as the combinational circuit 1100, explanation thereof is omitted.

With the above, in addition to the effect of the first embodiment, it is possible to save wiring resources of the FPGA 140 in comparison to the first embodiment.

Third Embodiment

The third embodiment is an embodiment in which the register space of each the PR is settable from the CPU 101. Therefore, in the present embodiment, the base address of each PR, which is input to the match detection circuits 610-613, is provided in the FPGA 140 as a register that is settable by the CPU 101.

Figure 13:
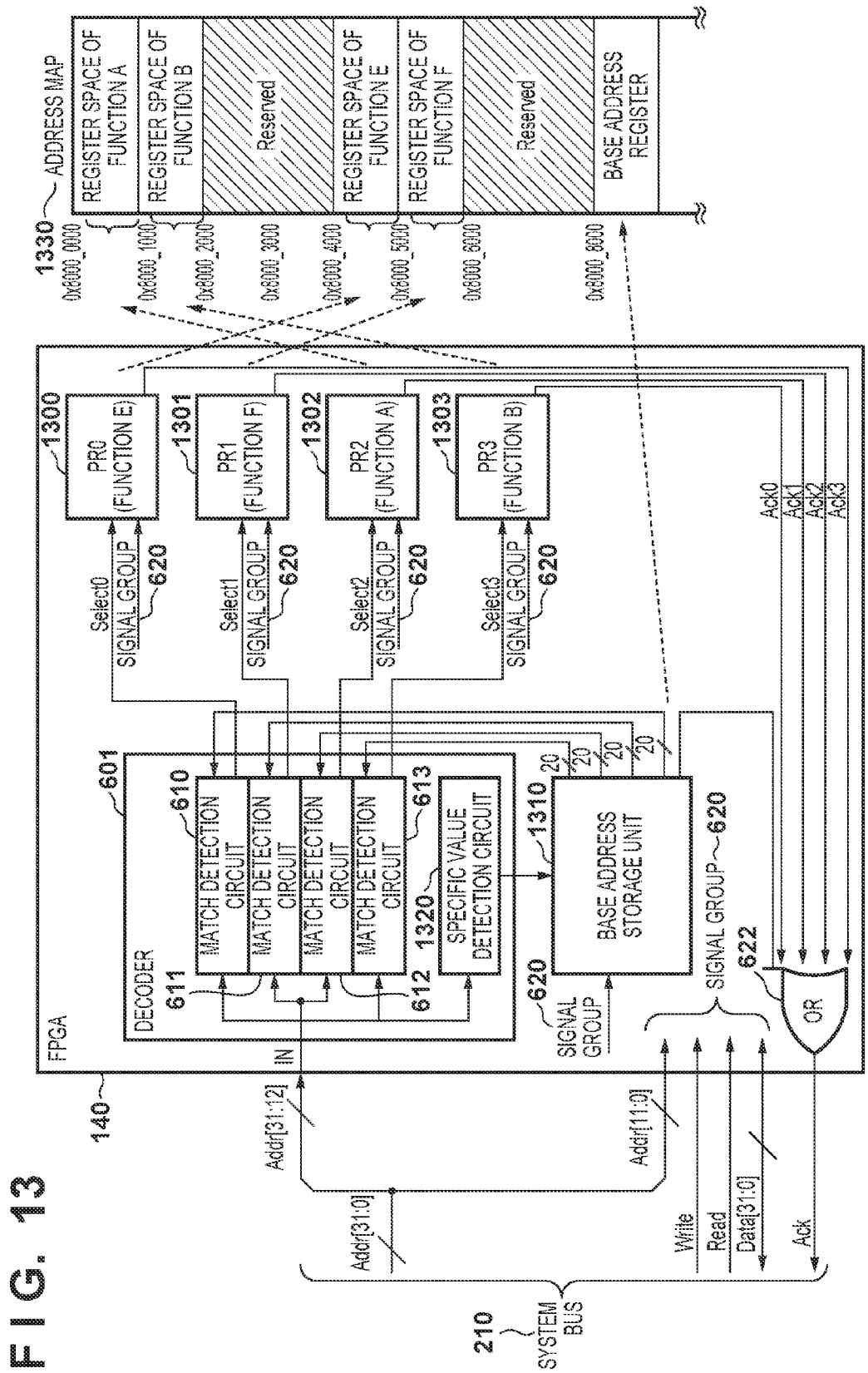
FIG. 13 is a view for explaining detail of an FPGA in accordance with the third embodiment.

FIG. 13 is the view for explaining detail of the FPGA 140 according to the present embodiment. Other than the FPGA 140, configuration is similar to the first embodiment, so explanation is omitted. The difference with the FPGA of the first embodiment (FIG. 6A) is the point that each PR (1300 to 1303) does not output the base address indicating the register space thereof, but rather a base address storage unit 1310 outputs it. Accordingly, in the present embodiment, the configuration data of each function does not need to include circuit information for outputting information relating to the register space (e.g., the base address).

The decoder 601 according to the present embodiment is equipped with a specific value detection circuit 1320. For the CPU 101 to access the base address storage unit 1310, the specific value detection circuit 1320 outputs, via the system bus 120, the Select signal to the base address storage unit 1310 if a received Addr[31:12] is a specific value. The specific value here is for example "0x80008". By this configuration, as illustrated in the address map 1330, the base address storage unit 1310 is allocated in a four kilobyte region from 0x8000_8000. In other words, if the CPU 101 accesses a four kilobyte region from 0x8000_8000, the base address storage unit 1310 is selected. Note that, similarly to the decoder 601, for the base address storage unit 1310, a circuit is configured by the configuration controller 130 when the power source is turned on, and thereafter it belongs to a static region in which reconfiguring is not performed.

Figure 14:
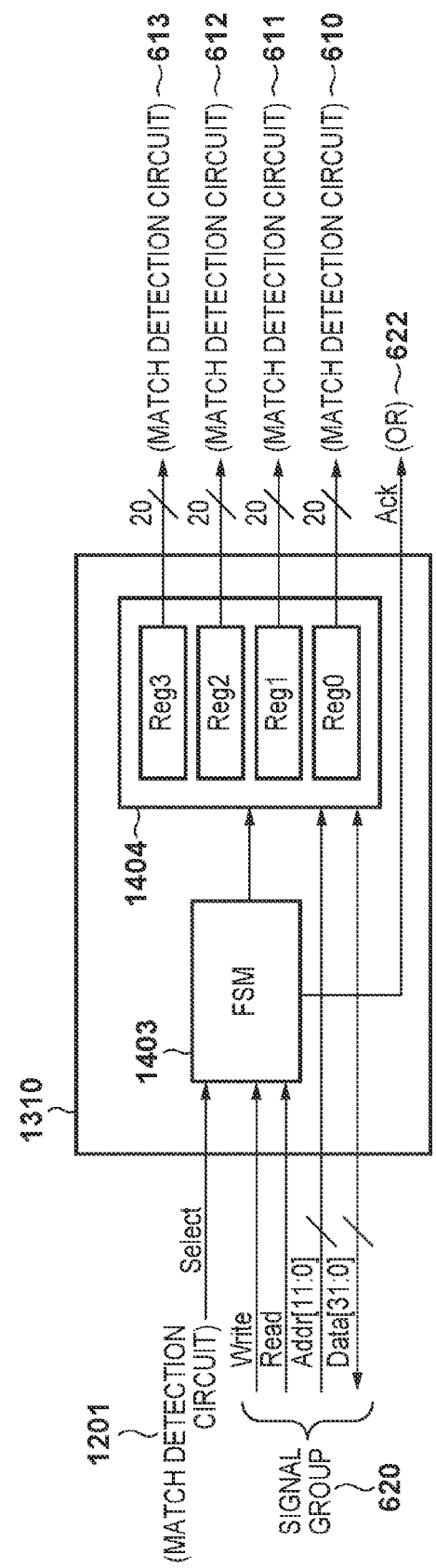
FIG. 14 is a view for explaining detail of a base address storage unit according to a third embodiment.

FIG. 14 is a view for explaining detail of the base address storage unit 1310 according to the present embodiment. The base address storage unit 1310 includes an FSM 1403 and a register group 1404. The FSM 1403, when Select input is enabled and an assert of a Write signal or a Read signal is received, instructs the register group 1404 for a write or a read, and also performs control to return an Ack signal. The timing is similar to the timing chart illustrated in FIG. 9.

The register group 1404 includes a Reg0, a Reg1, a Reg2, and a Reg3. Upon receiving a write instruction from the FSM 1403, the register group 1404 sets Data[19:0] to one register of the Reg0 to the Reg3, identified by Addr[11:0] of the signal group 620. Also, if a read instruction is received from the FSM 1403, the register group 1404 outputs a value of one register of the Reg0 to the Reg3 to the Data[19:0] signal, identified by Addr[11:0] of the signal group 620. The Reg0, the Reg1, the Reg2, and the Reg3 respectively indicate the base address of the register space of the PR0, the PR1, the PR2, and the PR3. In addition, the Reg0, the Reg1, the Reg2, and the Reg3 are respectively connected to the match detection circuits 610, 611, 612, and 613.

[Process Flow]

Figure 15:
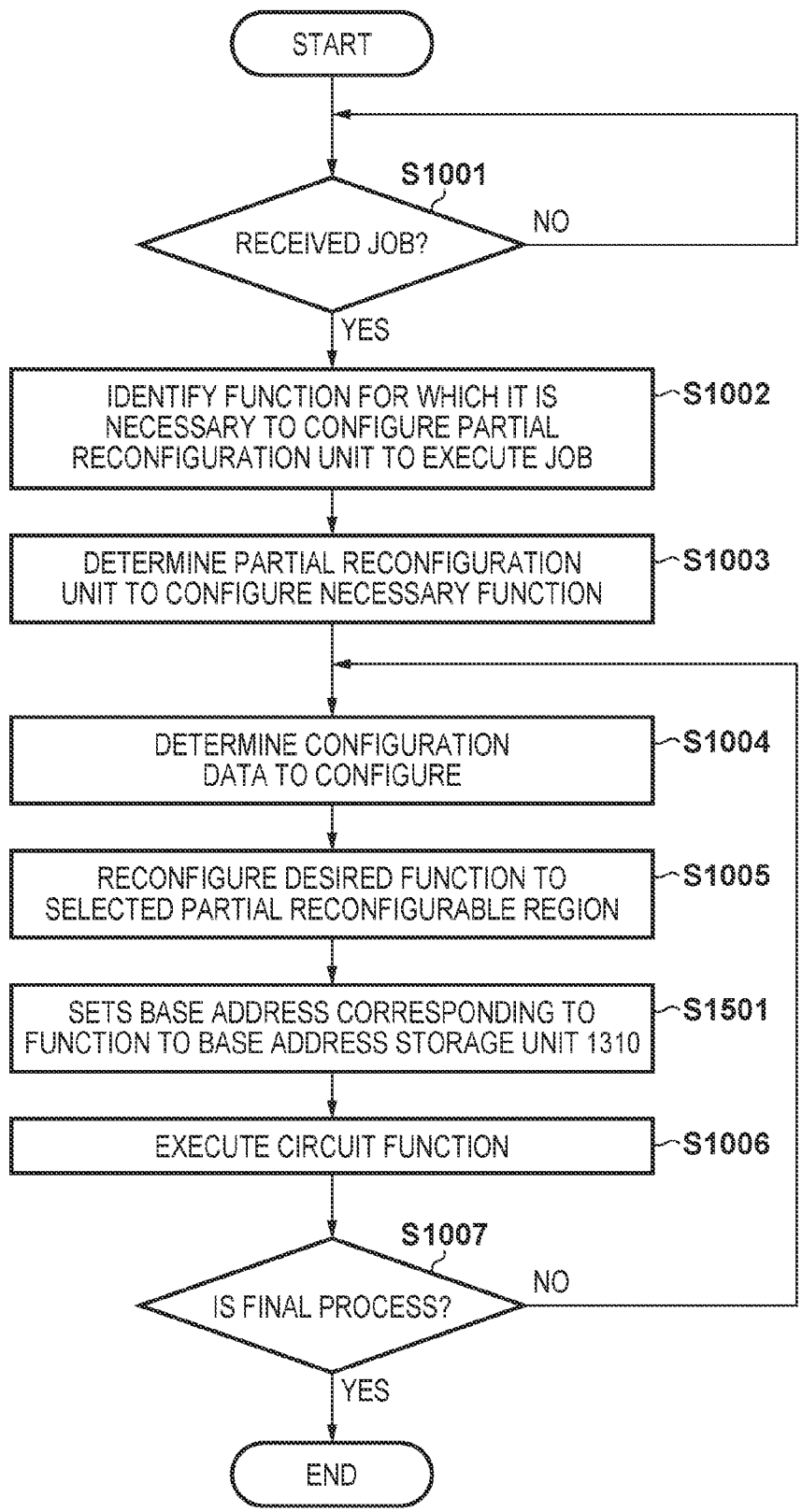
FIG. 15 is a flowchart of control processing according to the third embodiment.

FIG. 15 is a flowchart expressing job execution processing control of the image processing apparatus 100 according to the present embodiment. Note that the flowchart of FIG. 15 is executed by the CPU 101. A difference with the first embodiment, the third embodiment is a point that the CPU 101 performs setting to the base address storage unit 1310. In the flowchart of FIG. 15 this corresponds to step S1501. Note that, for processing that is the same as processing of FIG. 10 discussed in the first embodiment, the same reference numerals are added.

The flowchart as a whole is explained, focusing on the difference. Upon receiving a job (YES in step S1001), the CPU 101 identifies a function necessary for the job (step S1002), determines a PR to realize the function (step S1003), and determines the configuration data to configure (step S1004). Note that, in the present embodiment, the configuration data does not need to include circuit information for outputting information of a register space corresponding to a function (or information for identifying a function). Next, the CPU 101 reconfigures the function by loading the configuration data into the PR (step S1005).

Furthermore, in step S1501, the CPU 101 sets the base address of the register space corresponding to the function to a corresponding register of the register group 1404. Due to this step, the register space of the reconfigured function is allocated to a location illustrated in the address map 1330 of FIG. 13. In the case of the example of FIG. 13, specifically the Reg0, the Reg1, the Reg2, and the Reg3 are respectively set to 0x80004, 0x80005, 0x80000, and 0x80001.

Because step S1006 and step S1007 are the same as in the first embodiment, explanation thereof is omitted.

Thus, it is possible to obtain an effect similar to the first embodiment, even in the present embodiment.

Fourth Embodiment

Similar to the third embodiment, the fourth embodiment is an embodiment in which the register space of each PR is set by the CPU 101. In the present embodiment, for the allocation of the register space, a look-up table (LUT) is used. Note that, in the present embodiment, similarly to in the third embodiment, the configuration data does not need to include circuit information for outputting information of a register space corresponding to a function (or information for identifying a function).

Figure 16:
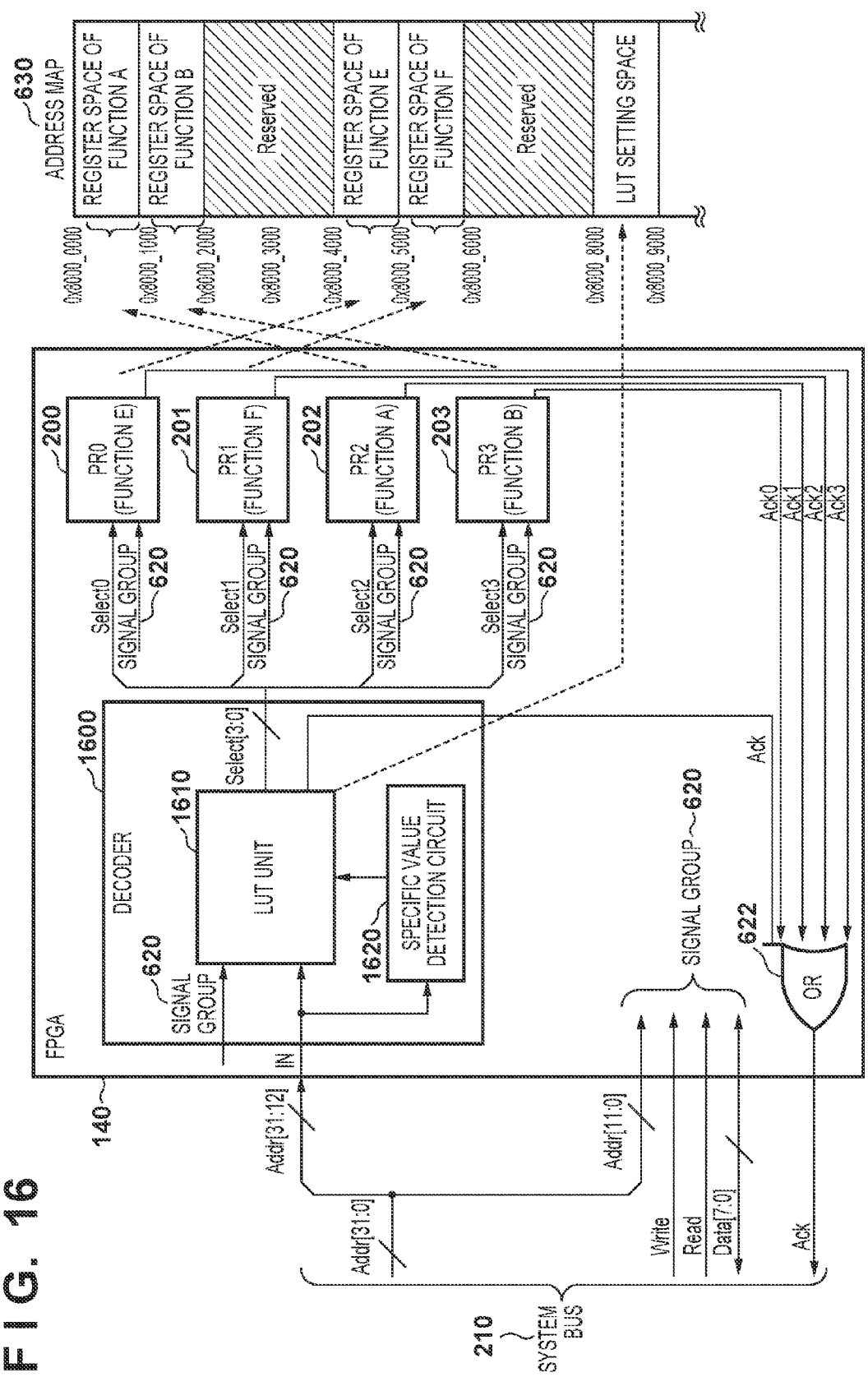
FIG. 16 is a view for explaining detail of an FPGA in accordance with a fourth embodiment.

FIG. 16 is the view for explaining detail of the FPGA 140 according to the present embodiment. Other than the FPGA 140, configuration is similar to the first embodiment, so explanation is omitted. A decoder 1600 in FIG. 16 has an LUT unit 1610 and a specific value detection circuit 1620. The LUT unit 1610 has Addr[31:12] as input, and a four-bit selection signal Select[3:0] as output. The specific value detection circuit 1620 detects access for setting output logic of the LUT unit 1610. For example, if setting of the output logic of the LUT unit 1610 is performed in a one kilobyte space from 0x8000_8000, the specific value detection circuit 1620 may configure a logic circuit that outputs "1" if the input Addr[31:12] is 0x80008.

FIG. 17A is the view for explaining detail of the LUT unit 1610 according to the present embodiment. An SRAM 1705 is an SRAM that outputs, as Select[3:0], four bits of data in accordance with a 20-bit address input, and the SRAM 1705 implements an LUT function. Here, which function is selected is indicated in accordance with the output four-bit Select signal. When the Select signal that the specific value detection circuit 1620 outputs is enabled ("1") and when the FSM 1703 receives an assert of a Write signal or a Read signal, the FSM 1703 transmits a write or read instruction to a register group 1710, and also performs Ack signal reply control.

The register group 1710 includes a one-bit SRAM setting mode register 1711 that indicates a mode that sets the output logic of the LUT, and a 20-bit SRAM address register 1712 that indicates a write address of the SRAM at a time of the SRAM setting mode. These are, for example, arranged in the LUT setting space as illustrated in the address map of FIG. 17B. Furthermore, the register group 1710 has a we signal generating unit 1713 that generates a write enable signal we when the CPU 101 has performed a write access to an SRAM port address arranged in the same setting space. By the above configuration, the CPU 101 can set any data to any address of the SRAM 1705.

[SRAM Setting Processing]

The procedure of the SRAM setting processing is explained by using the flowchart of FIG. 17C. Note that the flowchart of FIG. 17C is executed by the CPU 101.

In step S1701, the CPU 101 sets "1" to the SRAM setting mode register 1711. Furthermore, the CPU 101 causes a selector 1706 to select the value of the SRAM address register 1712 as the input of the SRAM 1705.

In step S1702, the CPU 101 sets the address of the SRAM 1705 that is desired to be set to the SRAM address register 1712.

In step S1703, the CPU 101 writes the data desired to be set to the SRAM data port address. Thereby, the we signal generating unit 1713 causes a pulse of a write signal to be generated. At this time, because the four bits of Data[3:0] are input to a D input of the SRAM 1705, that data is written to the address of the SRAM 1705 set in step S1702.

In step S1704, the CPU 101 determines whether to continue to write other data to the SRAM 1705. If other data is written (YES in step S1704), the processing returns to step S1702, and if other data is not written (NO in step S1704), the processing proceeds to step S1705.

In step S1705, the CPU 101 clears the SRAM setting mode register 1711. Furthermore, the CPU 101 enables a decode function for selecting the PR0 to the PR3. This processing flow is then terminated.

FIG. 17D illustrates values set in the SRAM 1705 if the function E, the function F, the function A, and the function B are configured in the PR0 to the PR3. The four bits of FIG. 17D correspond to the PR0, the PR1, the PR2, and the PR3, in order from a lower order bit. For example, "0100" indicates that the PR2 is selected.

[Process Flow]

Figure 18:
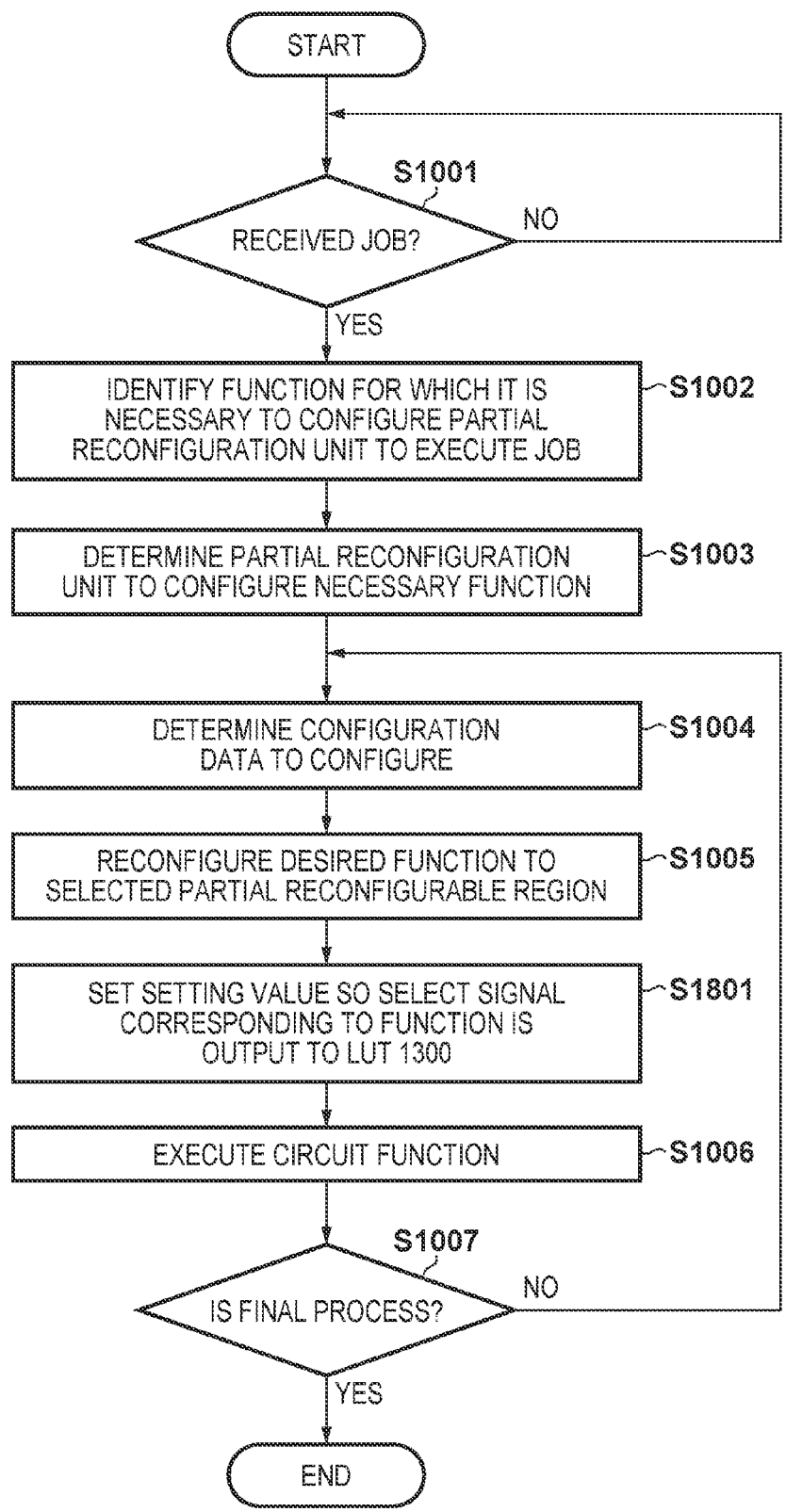
FIG. 18 is a flowchart of control processing according to the fourth embodiment.

FIG. 18 is a flowchart expressing job execution processing control of the image processing apparatus 100 according to the present embodiment. The flowchart of FIG. 18 is executed by the CPU 101.

While in the third embodiment the CPU 101 performs setting to the base address storage unit 1310 in step S1501 of FIG. 15, in the fourth embodiment there is a difference in that setting is performed to the LUT unit 1610 in step S1801 of FIG. 18. The processing for setting to the LUT unit 1610 in step S1801 of FIG. 18 is performed by the procedure illustrated by FIG. 17C.

Thus, it is possible to obtain a similar effect to the third embodiment even in the configuration according to the present embodiment, and furthermore, it is possible to suppress a processing load in the decoder in comparison to the third embodiment.

Fifth Embodiment

The fifth embodiment is an embodiment provided with a unit that detects an error in configuration data, or an erroneous setting of the register space. For example, assume that there is an error in the configuration data of the function E configured in the PR0 in FIGS. 6A and 6B of the first embodiment, and "0x80005" instead of "0x80004" is output as PR0_Base. In such a case, this overlaps with PR1_Base of the function F configured in the partial reconfiguration unit 201. As a result, there is a possibility that, if the CPU 101 accesses the register space of the function F, then both Select0 and Select1 are asserted, and the system hangs. If such an error is generated identifying a cause is difficult, so being able to detect erroneous configuration data or an erroneous setting of the register space is desirable. This problem is solved in the present embodiment.

Figure 19:
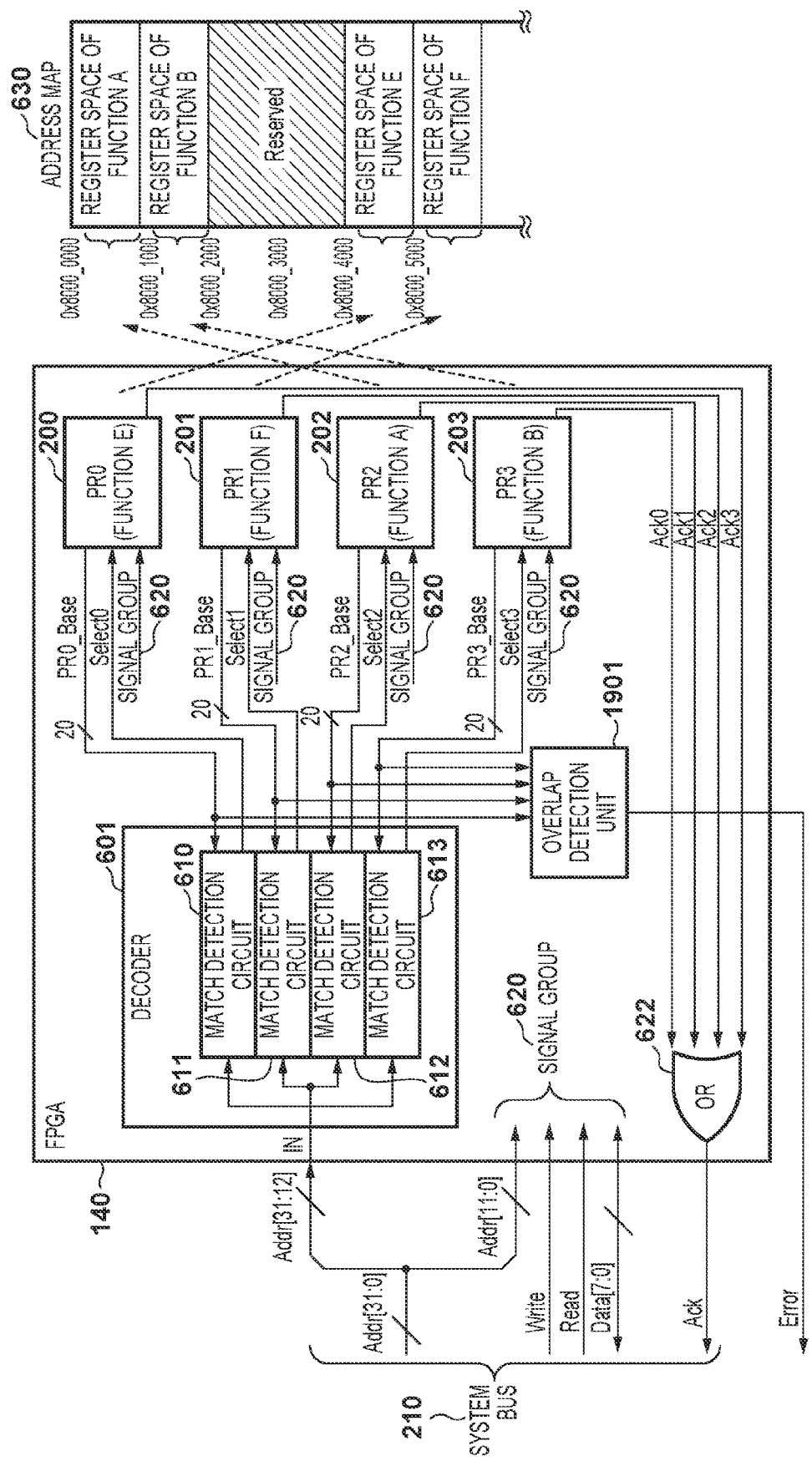
FIG. 19 is a view for explaining detail of an FPGA in accordance with the fifth embodiment.

FIG. 19 is the view for explaining detail of the FPGA 140 according to the present embodiment. Other than the FPGA 140, configuration is similar to the first embodiment, so explanation is omitted. In FIG. 19, a difference with the first embodiment (FIG. 6A) is that the FPGA 140 is provided with an overlap detection unit 1901. The overlap detection unit 1901 is input with PR0_Base, PR1_Base, PR2_Base, and PR3_Base, which are output from respective PRs, and if there is the same value in these signals, outputs an Error signal. The Error signal is notified to the CPU 101 via an interrupt detection circuit (not shown). Note that, similarly to the decoder 601, for the overlap detection unit 1901, a circuit is configured by the configuration controller 130 when the power source is turned on, and thereafter it belongs to a static region in which reconfiguring is not performed.

In the present embodiment, similarly to in the first embodiment, each piece of the configuration data includes circuit information of the Base output unit for outputting the address in the register space corresponding to the function. Alternatively, similarly to in the second embodiment, configuration data may be taken so as to include circuit information that outputs identification information.

Figure 20:
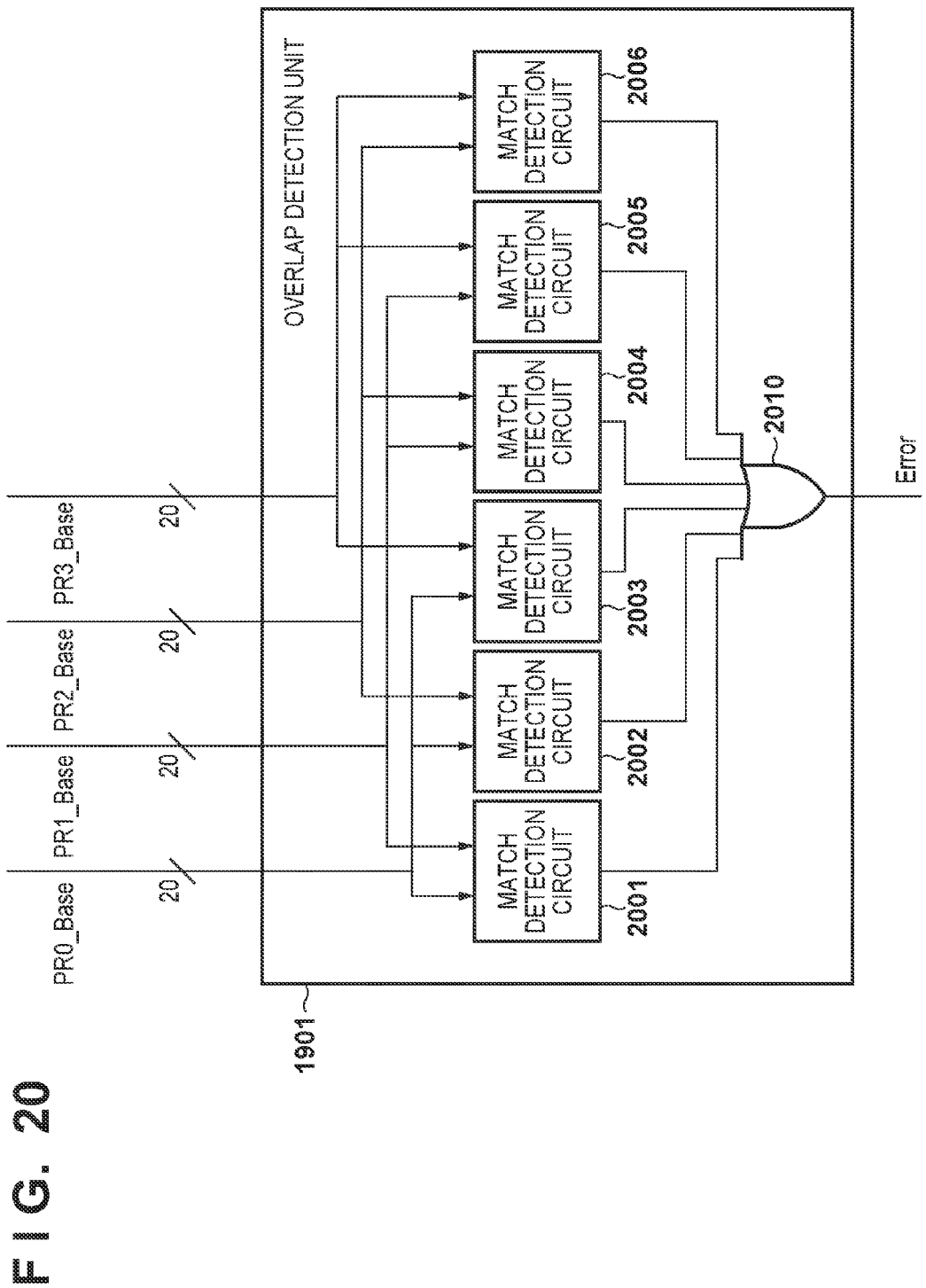
FIG. 20 is a view for explaining detail of an overlap detection unit in accordance with a fifth embodiment.

FIG. 20 is the view for explaining detail of the overlap detection unit 1901 according to the present embodiment. In FIG. 20, match detection circuits 2001-2006 are circuits that have the same logical configuration as the match detection circuit 610 illustrated in FIG. 7. The match detection circuits 2001-2006 are configured so as that one of the match detection circuit outputs "1" when any set of two of the PR0_Base, PR1_Base, PR2_Base, and PR3_Base are equal. A logical or by an OR 2010 is obtained for the output of the match detection circuits 2001-2006, and is output as the Error signal. In other words, by the match detection circuits 2001-2006 and the OR 2010, if any of PR0_Base, PR1_Base, PR2_Base, and PR3_Base are equal, the Error signal is output.

If the Error signal is output, for example the CPU 101 may control so as to reconfigure the partial reconfiguration units. In addition, in the present embodiment, only detection of overlapping is performed, but, for example, configuration may be taken such that it is detected whether overlapping has occurred regardless of the partial reconfiguration unit.

By the present embodiment, an error in configuration data or an erroneous setting of a register space are detectable.

Sixth Embodiment

The sixth embodiment is an embodiment provided with a unit through which an Ack signal is sent back, even if the CPU 101 accesses a register space corresponding to a function not configured in any of the PRs. For example, in FIG. 6A of the first embodiment, if the CPU 101 accesses the address 0x80002000 included in the register space of the function C, because no access to any PR occurs, an Ack signal is not returned to the CPU 101, and the system hangs. In the case of such an error, because identifying the cause is difficult, it is desirable that an Ack signal be sent back even if the CPU 101 accesses a register space corresponding to a function not configured in any of the PR0 to the PR3. This problem is solved in the present embodiment.

Note that in the present embodiment, similarly to in the first embodiment, each piece of the configuration data includes circuit information of the Base output unit for outputting the address in the register space corresponding to the function. Alternatively, similarly to in the second embodiment, configuration may be taken so as to include circuit information that outputs identification information.

Figure 21:
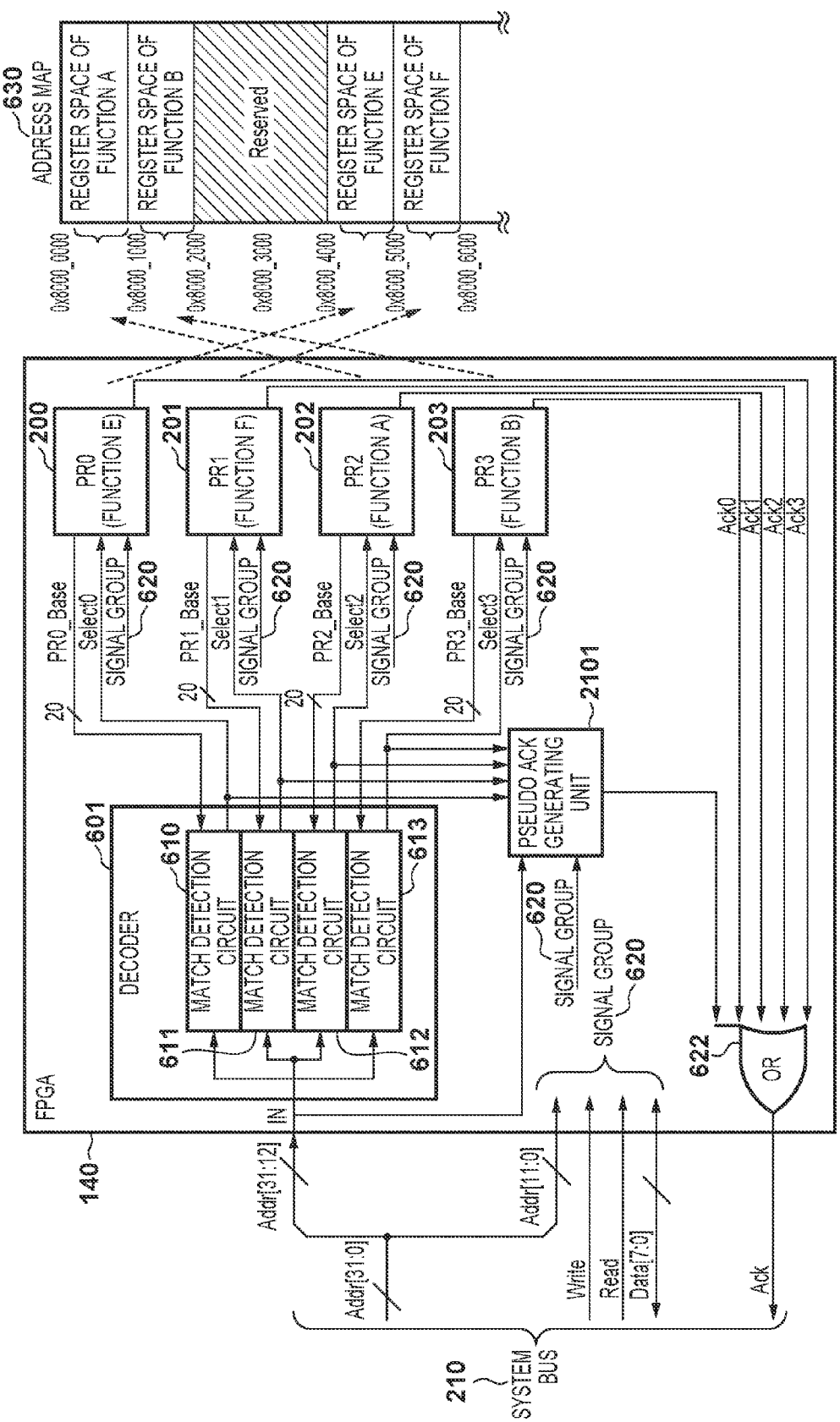
FIG. 21 is a view for explaining detail of an FPGA in accordance with a sixth embodiment.

FIG. 21 is the view for explaining detail of the FPGA 140 according to the sixth embodiment. Other than the FPGA 140, configuration is similar to the first embodiment, so explanation is omitted. In FIG. 21, a difference with the first embodiment is that the FPGA 140 is provided with a pseudo Ack generating unit 2101. The pseudo Ack generating unit 2101 has the Select signals output by the match detection circuits 610, 611, 612, and 613, Addr[31:12], and the signal group 620 as inputs, and generates a pseudo Ack signal. For the pseudo Ack signal generated by the pseudo Ack generating unit 2101, a logical or is obtained by the OR 622, and notified to the CPU 101.

Figure 22:
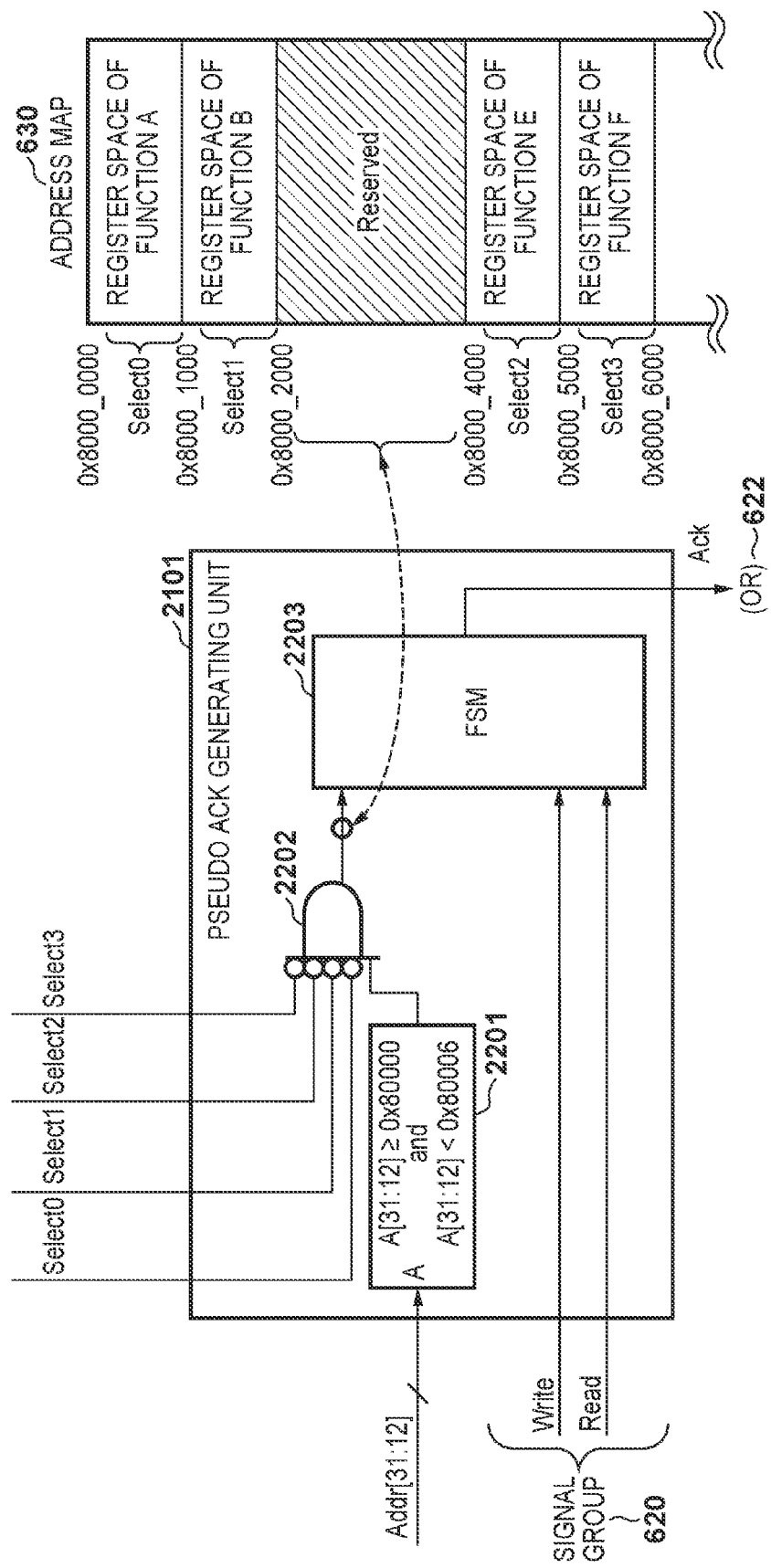
FIG. 22 is a view for explaining detail of an Ack generating unit in accordance with a sixth embodiment.

FIG. 22 is a view for explaining detail of the pseudo Ack generating unit 2101. In FIG. 22, a logic circuit 2201 is a logic circuit that outputs "1" if Addr[31:12] is included in the range of 0x80000 to 0x80006. An AND element 2202 outputs "1" if all signals of Select0 to Select3 are not asserted and when the logic circuit 2201 outputs "1". In other words, the output of the AND element 2202 is "1" when the CPU 101 has accessed the Reserved region of the address map 630. An FSM 2203 outputs the pseudo Ack signal when the output of the AND element 2202 is "1" and the Write signal or the Read signal of the signal group 620 is "1". The output timing is the same as in the timing chart of FIG. 9 discussed in the first embodiment.

Thus, an Ack signal is returned even if the address space of a function not configured in a PR is mistakenly accessed. Therefore, by the virtue of the present embodiment, it is possible to prevent the system hanging even if a mistaken access occurs.

Seventh Embodiment

In the first to sixth embodiments, units were applied such that regardless of which PR the logic circuit of a function is reconfigured in, the register space for controlling the logic circuit does not change. In other words, in the first to sixth embodiments, the usable register space for each function is fixed.

In the seventh embodiment, in accordance with a PR in which the logic circuit of a function is partially reconfigured, the register space is caused to change. Accordingly, explanation is given for an embodiment in which a program changes an address for register access in combination with a change of the register space.

Figure 23:
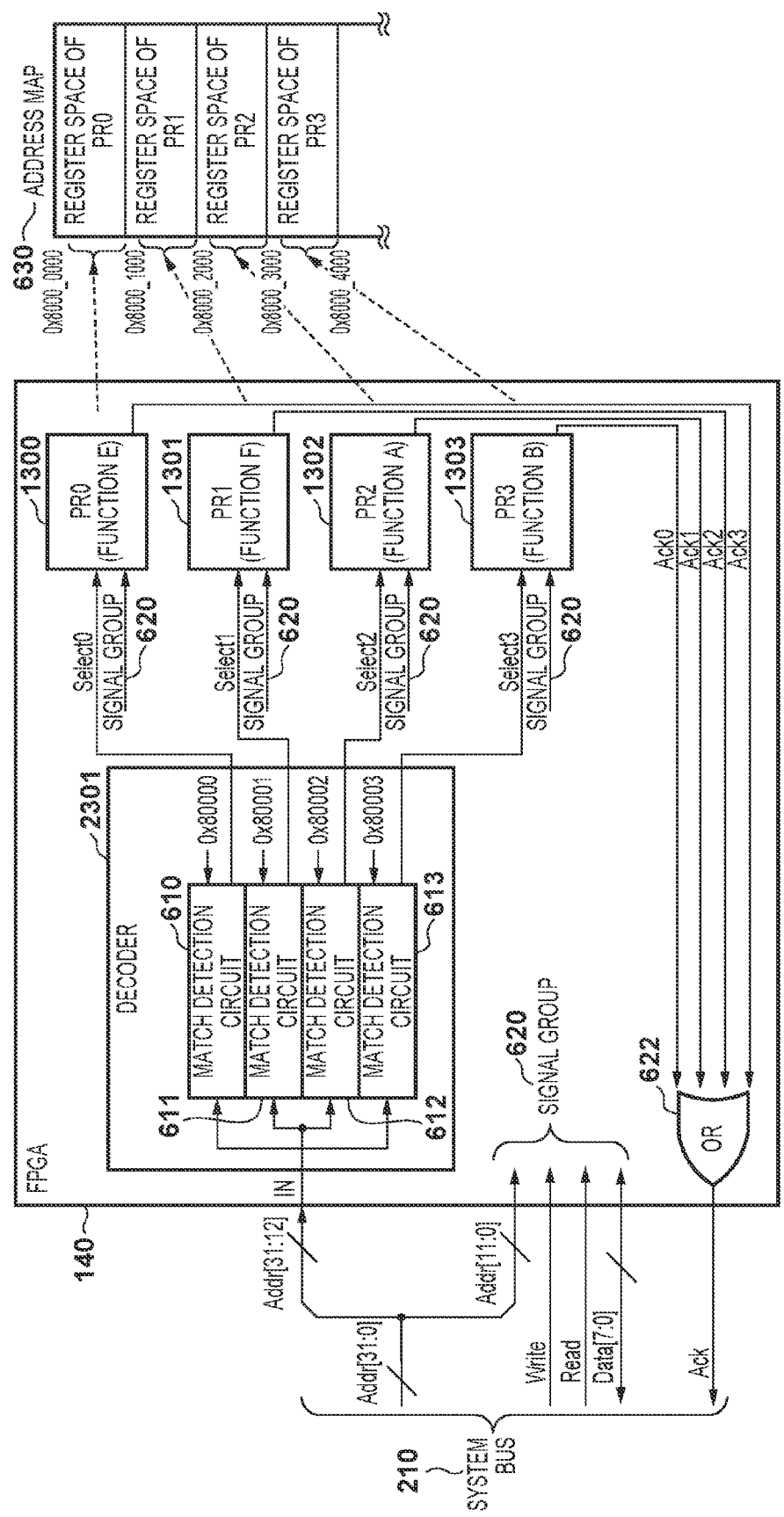
FIG. 23 is a view for explaining detail of an FPGA in accordance with a seventh embodiment.

FIG. 23 is the view for explaining detail of the FPGA 140 according to the seventh embodiment. Other than the FPGA 140, configuration is similar to the first embodiment, so explanation is omitted. Note that in the present embodiment, the configuration data of each function does not need to include circuit information for outputting information relating to the register space.

As a difference with the first embodiment, there is a point in that a decoder 2301 of the seventh embodiment uniquely determines output of Select0 to Select3 in accordance with a value of Addr[31:12]. In other words, if Addr[31:12] is 0x80000, Select0 is output. Similarly, if Addr[31:12] is 0x80001, Select1 is output, if Addr[31:12] is 0x80002, Select2 is output, and if Addr[31:12] is 0x80003, Select3 is output. In other words, the register space of each the PR is independent of a configured function, and a usable register space is fixed for each PR. In other words, even with the same function, the register space for controlling the function is modified depending on the configured PR.

[Process Flow]

Figure 24:
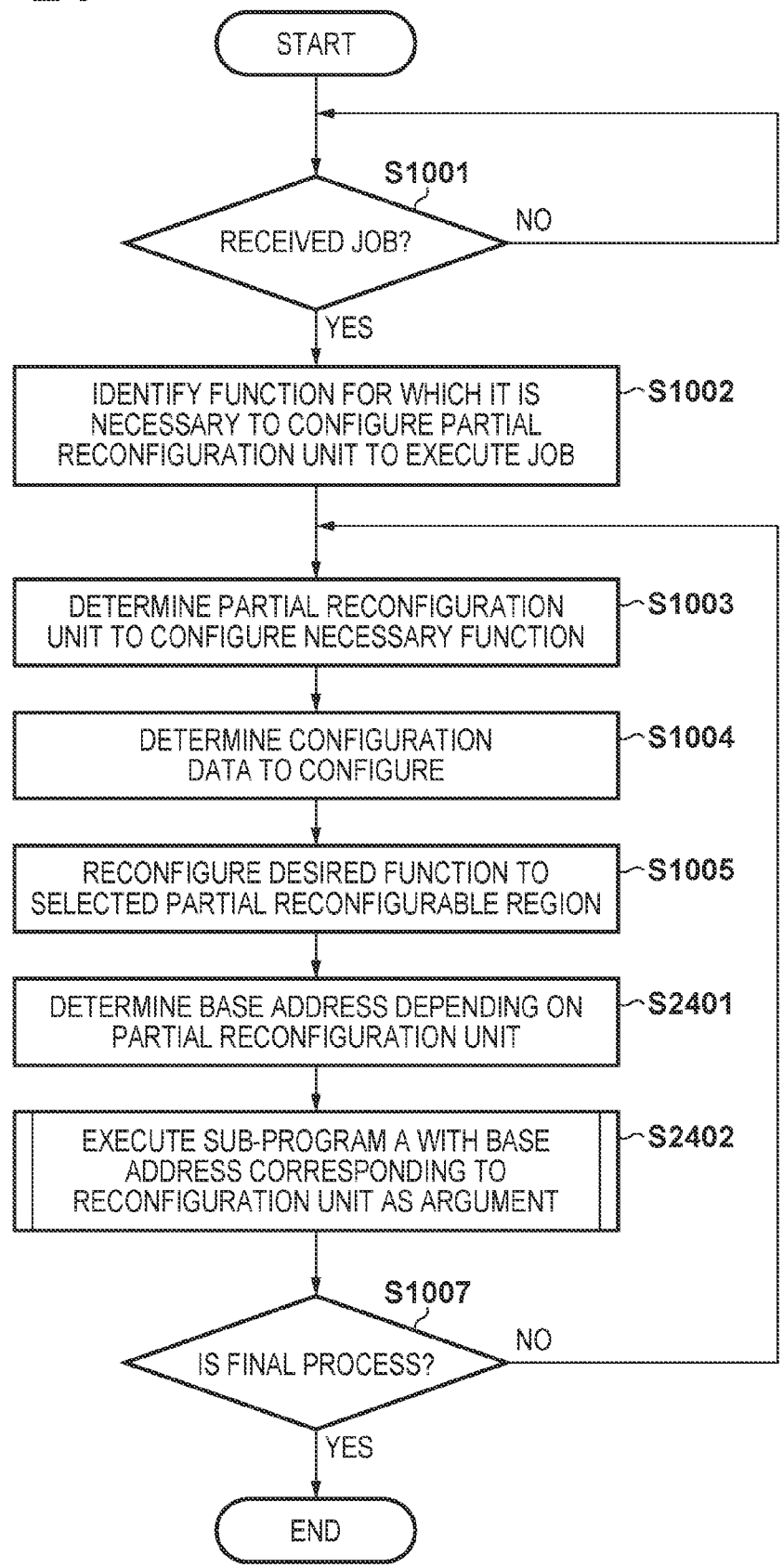
FIG. 24 is a flowchart of control processing according to a seventh embodiment.

FIG. 24 is a flowchart expressing job execution processing control of the image processing apparatus 100 according to the present embodiment. Note that the flowchart of FIG. 24 is executed by the CPU 101.

Upon receiving a job (YES in step S1001), the CPU 101 identifies the function A, for example, as a function necessary for the job (step S1002), and determines the PR2, for example, as the PR in which to configure the function (step S1003). Furthermore, the CPU 101 determines configuration data to be configured (step S1004). At this point, the configuration data corresponding to the PR that reconfigures the function is determined. Note that, in the present embodiment, the configuration data does not need to include circuit information for outputting information of a register space corresponding to a function.

Next, in step S2401, the CPU 101 obtains a base address associated with the PR that is the target. For example, if the PR that is to realize the function is the PR2, the base address is "0x8000_2000", which corresponds to the PR2. In the present embodiment, base addresses that are to be references are defined in advance in accordance with a PR.

In step S2402, the CPU 101 executes a sub-program A with the base address as an argument. The sub-program A is a control program that causes predetermined processing to be executed by accessing a control register of the PR in which the function A is configured. The sub-program A is also executed by the CPU 101.

Figure 25A:
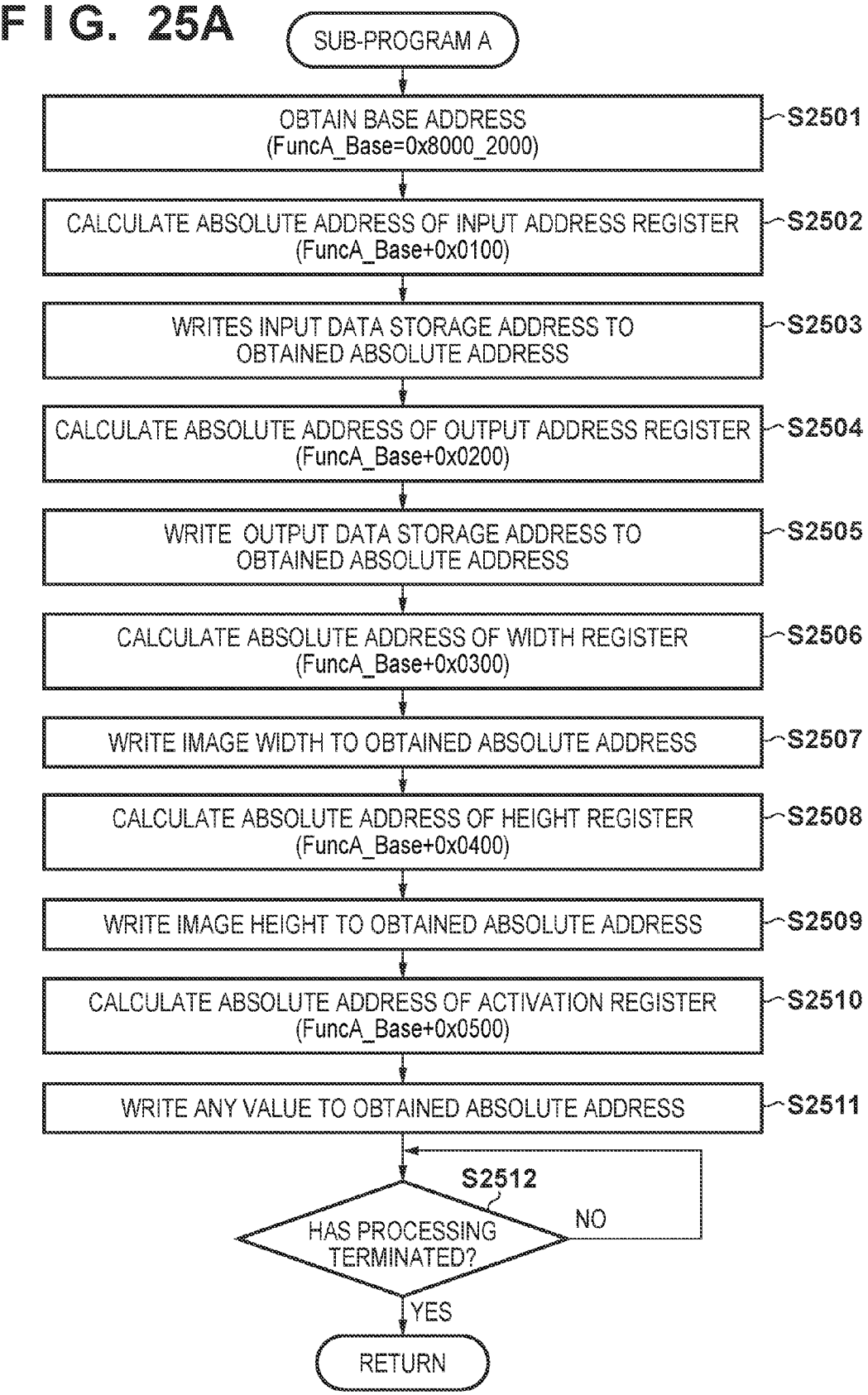
FIGS. 25A and 25B are flowcharts of operations in a sub-program according to the seventh embodiment.
Figure 25B:
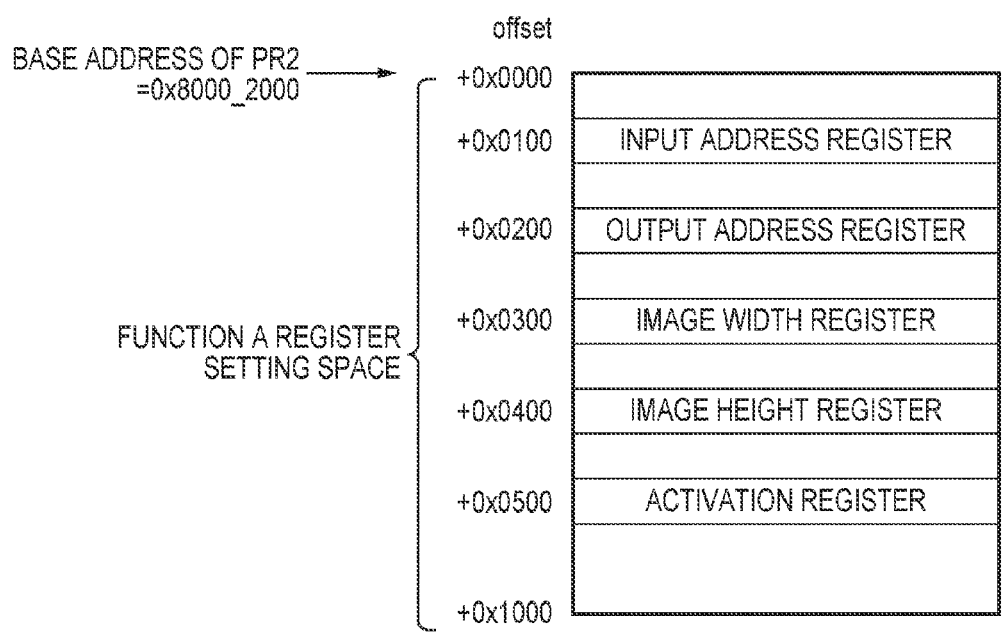

A processing flow of the sub-program A in step S2402 is illustrated in FIG. 25A. Here, the logic circuit of the function A is, for example, JPEG compression processing. In such a case, the logic circuit of the function A includes, for example, the following registers. Specifically, there are an input address register that indicates a storage address of input data, an output address register that indicates a compressed data output destination address, a width register that indicates an image size, a height register, and an activation register that causes processing to start in accordance with the writing of arbitrary data. The sub-program A recognizes the addresses of these registers as offsets from the base address. Because the base address is designated by a high level program (here, the program of the flowchart illustrated in FIG. 24), by using this base address and an offset values, it is possible to use the same sub-program A regardless of which PR the function A is configured in. The offset values are defined in advance. Note that the offsets are not limited to the values of FIG. 25B, and can be determined in accordance with a function.

In step S2501, the CPU 101 obtains the argument base address as a variable FuncA_Base. Below steps continue with a pair of processing that obtains the absolute address of a register, and processing that accesses the register.

In step S2502, the CPU 101 calculates the absolute address of an input address register by adding FuncA_Base and an offset (0x100) of the input address register. In the example illustrated here, the absolute address of the input address register is 0x8000_2100. In step S2503, the CPU 101 writes a storage address of input data to the absolute address obtained in step S2502.

In step S2504, the CPU 101 calculates the absolute address of an output address register by adding FuncA_Base and an offset (0x200) of the output address register. In the case of the example illustrated here, the absolute address of the output address register is 0x8000_2200. In step S2505, the CPU 101 writes an output destination address for compressed data to the absolute address obtained in step S2504.

In step S2506, the CPU 101 calculates the absolute address of a width register by adding FuncA_Base and an offset (0x300) of the width register. In the example illustrated here, the absolute address of the width register is 0x8000_2300. In step S2507, the CPU 101 writes an image width to the absolute address obtained in step S2506.

In step S2508, the CPU 101 calculates the absolute address of a height register by adding FuncA_Base and an offset (0x400) of the height register. In the example illustrated here, the absolute address of the height register is 0x8000_2400. In step S2509, the CPU 101 writes an image height to the absolute address obtained in step S2508.

In step S2510, the CPU 101 calculates the absolute address of an activation register by adding FuncA_Base and an offset (0x500) of the activation register. In the example illustrated here, the absolute address of the activation register is 0x8000_2500. In step S2511, an arbitrary value is written to the activation address obtained in step S2510.

In step S2512, the CPU 101 waits for termination of the compression processing, and determines whether processing has terminated. If processing has terminated (YES in step S2512), the CPU 101 terminates the sub-program A, and returns to the high level program (the processing proceeds to step S1007 of FIG. 24).

Because step S1007 is the same as in the first embodiment, explanation thereof is omitted.

Thus, in the configuration illustrated in the present embodiment it is possible to obtain an effect similar to the first embodiment.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-016086, filed Jan. 29, 2015, which is hereby incorporated by reference herein in its entirety.

What is claimed is:

1. An information processing apparatus comprising:
a programmable circuit unit comprising a partial reconfiguration unit wherein (a) one or more logic circuits is configured in the partial reconfiguration unit, and (b) a logic circuit of the one or more logic circuits is reconfigurable, by using configuration data corresponding to a function, to realize the function in the partial reconfiguration unit;

a storage unit configured to be used by each of the one or more logic circuits configured in the partial reconfiguration unit; and a control unit configured to control a logic circuit that becomes an access destination, in accordance with receiving an access command, wherein the configuration data includes circuit information for configuring the partial reconfiguration unit such that the partial reconfiguration unit outputs a signal for identifying an address space in the storage unit used by the logic circuit realizing the function corresponding to the configuration data, and wherein the control unit (a) compares an address space indicating the access destination of the access command with the signal that is output from the partial reconfiguration unit due to the partial reconfiguration unit being configured using the circuit information, and (b) controls to set, as an access destination, the logic circuit configured in the partial reconfiguration unit outputting the signal matching the address space indicating the access destination of the access command.

2. The information processing apparatus according to claim 1, wherein the programmable circuit unit is provided with a plurality of partial reconfiguration units.

3. The information processing apparatus according to claim 2, further comprising a notification unit configured to transmit a notification, if it is detected that the address space indicating the access destination of the access command is an address space that does not correspond to any logic circuit configured in the plurality of partial reconfiguration units.

4. The information processing apparatus according to claim 1, wherein the programmable circuit unit is provided with a plurality of partial reconfiguration units, and wherein the information processing apparatus further comprises a detection unit configured to detect whether or not there is an overlap of the signals output from each of the plurality of the partial reconfiguration units due to the partial reconfiguration units being configured using the circuit information included in the configuration data.

5. The information processing apparatus according to claim 1, wherein the address spaces in the storage unit used by the respective logic circuits that are reconfigurable in the partial reconfiguration unit are fixed.

6. The information processing apparatus according to claim 1, wherein the access command is a read command or a write command with respect to an address space of the storage unit.

7. An information processing apparatus comprising:
a programmable circuit unit comprising a partial reconfiguration unit wherein (a) one or more logic circuits is configured in the partial reconfiguration unit, and (b) a logic circuit of the one or more logic circuits is reconfigurable, by using configuration data corresponding to a function, to realize the function in the partial reconfiguration unit;

a storage unit configured to be used by each of the one or more logic circuits configured in the partial reconfiguration unit;

a reconfiguration unit configured to use the configuration data to cause a logic circuit to be configured in the partial reconfiguration unit;

an identification unit configured to identify an address space in the storage unit that corresponds to the partial reconfiguration unit in which the logic circuit is configured; and a control unit configured to designate as an access destination the logic circuit configured in the partial reconfiguration unit by using the address space identified by the identification unit to designate an access destination of an access command.

8. The information processing apparatus according to claim 7, wherein an address space in the storage unit used by the partial reconfiguration unit that reconfigures the logic circuit is fixed.

9. The information processing apparatus according to claim 7, wherein the identification unit identifies an address that becomes a reference for the address space, and wherein the control unit uses the address that becomes the reference and an offset defined in accordance with the logic circuit to designate an address in the storage unit.

10. An information processing apparatus comprising:
a programmable circuit unit comprising a partial reconfiguration unit wherein (a) one or more logic circuits is configured in the partial reconfiguration unit, and (b) a logic circuit of the one or more logic circuits is reconfigurable, by using configuration data corresponding to a function, to realize the function in the partial reconfiguration unit;

a storage unit configured to be used by each of the one or more logic circuits configured in the partial reconfiguration unit; and a control unit configured to control a logic circuit that becomes an access destination, in accordance with receiving an access command, wherein the configuration data includes circuit information for configuring the partial reconfiguration unit such that the partial reconfiguration unit outputs an identification signal for identifying the logic circuit realizing the function that corresponds to the configuration data, and wherein the control unit (a) compares an address space indicating the access destination of the access command with an address space associated with the identification signal output from the partial reconfiguration unit due to the partial reconfiguration unit being configured using the circuit information, and (b) controls to set, as an access destination, the logic circuit corresponding to the address space matching the address space indicating the access destination of the access command.

11. The information processing apparatus according to claim 10, wherein the programmable circuit unit is provided with a plurality of partial reconfiguration units, and wherein the information processing apparatus further comprises a detection unit configured to detect whether or not there is an overlap of the identification signals output from each of the plurality of the partial reconfiguration units due to the partial reconfiguration units being configured using the circuit information included in the configuration data.

12. An information processing apparatus comprising:
a programmable circuit unit comprising a partial reconfiguration unit wherein (a) one or more logic circuits is configured in the partial reconfiguration unit, and (b) a logic circuit of the one or more logic circuits is reconfigurable, by using configuration data corresponding to a function, to realize the function in the partial reconfiguration unit;

a first storage unit configured to be used by each of the one or more logic circuits configured in the partial reconfiguration unit;

a control unit configured to control a logic circuit that becomes an access destination in accordance with receiving an access command; and a second storage unit configured to accept and store information of an address space in the first storage unit that is used by each of logic circuits that is reconfigurable in the partial reconfiguration unit;

wherein the control unit (a) compares an address space indicating the access destination of the access command with the address space stored in the second storage unit, and (b) controls so as to set, as an access destination, a logic circuit matching the address space indicating the access destination of the access command.

13. An information processing apparatus comprising:

a programmable circuit unit comprising a partial reconfiguration unit wherein (a) one or more logic circuits is configured in the partial reconfiguration unit, and (b) a logic circuit of the one or more logic circuits is reconfigurable, by using configuration data corresponding to a function, to realize the function in the partial reconfiguration unit;

a storage unit configured to be used by each of the one or more logic circuits configured in the partial reconfiguration unit;

a control unit configured to control a logic circuit that becomes an access destination, in accordance with receiving an access command; and a storage unit configured to accept and store, as a look-up table (LUT), information of an address space in the storage unit that is used by each of logic circuits that is reconfigurable in the partial reconfiguration unit;

wherein the control unit (a) uses the LUT to identify a logic circuit corresponding to an address space indicating the access destination of the access command, and (b) controls to set, as an access destination, the identified logic circuit.

* * * * *